(12) United States Patent
Van Slembrouck

(10) Patent No.: US 8,866,842 B2
(45) Date of Patent: Oct. 21, 2014

(54) ADAPTIVE CONTENT AUTHORING

(75) Inventor: Justin Van Slembrouck, Brooklyn, NY (US)

(73) Assignee: Adobe Systems Incorporated, San Jose, CA (US)

( * ) Notice: Subject to any disclaimer, the term of this patent is extended or adjusted under 35 U.S.C. 154(b) by 751 days.

(21) Appl. No.: 13/113,250

(22) Filed: May 23, 2011

(65) Prior Publication Data

US 2013/0127919 A1 May 23, 2013

(51) Int. Cl.
*G06G 5/00* (2006.01)
*G06F 17/00* (2006.01)
*G06F 3/048* (2013.01)
*G06F 17/21* (2006.01)
*G06T 11/60* (2006.01)

(52) U.S. Cl.
CPC .............. *G06T 11/60* (2013.01); *G06F 17/211* (2013.01)
USPC ........... 345/619; 345/660; 715/210; 715/234; 715/240; 715/243; 715/251; 715/252; 715/788; 715/799; 715/800

(58) Field of Classification Search
CPC .................... G06F 17/30896; G06F 17/30899; G06F 17/30905; G06F 17/211; H04N 21/2353; H04N 21/2355; H04N 21/2358; H04L 65/2823; H04L 65/4084; G06T 11/60
USPC ........... 345/428, 619, 660; 709/231; 715/201, 715/209, 210, 234–253, 788–801
See application file for complete search history.

(56) References Cited

U.S. PATENT DOCUMENTS

| | | | |
|---|---|---|---|
| 6,897,880 B2 * | 5/2005 | Samra | 345/619 |
| 7,484,182 B1 * | 1/2009 | Smith | 715/794 |
| 2004/0205472 A1 | 10/2004 | Purvis | |
| 2005/0055635 A1 | 3/2005 | Bargeron et al. | |
| 2005/0094207 A1 * | 5/2005 | Lo et al. | 358/1.18 |
| 2005/0188303 A1 * | 8/2005 | Ayers et al. | 715/517 |
| 2005/0216858 A1 | 9/2005 | Fabritius | |
| 2006/0111970 A1 | 5/2006 | Hill et al. | |
| 2006/0259859 A1 | 11/2006 | Ivarsoy et al. | |
| 2007/0079236 A1 * | 4/2007 | Schrier et al. | 715/517 |
| 2007/0174291 A1 | 7/2007 | Cooper et al. | |
| 2009/0080789 A1 * | 3/2009 | Shoji | 382/254 |
| 2009/0171920 A1 | 7/2009 | Wade et al. | |
| 2013/0125033 A1 * | 5/2013 | Kelley | 715/765 |
| 2013/0127916 A1 | 5/2013 | Van Slembrouk | |
| 2013/0185632 A1 * | 7/2013 | Damera-Venkata | 715/243 |

OTHER PUBLICATIONS

Charles Jacobs, Wil Li, Evan Schrier, David Bargeron, David Salesin, Adaptive Document Layout, 2004, Communications of the ACM, 47(8):61-66.*

(Continued)

*Primary Examiner* — Xiao Wu
*Assistant Examiner* — Michael J Cobb
(74) *Attorney, Agent, or Firm* — Wolfe-SBMC

(57) ABSTRACT

Various embodiments of methods and apparatus for adaptive content authoring are disclosed. A dimensionally-linked authoring interface comprising a dimension control for associating values of a dimension to frames is displayed. A plurality of frames and input associating each of the plurality of frames to a respective value of the dimension are received. A data structure comprising the plurality of frames and associations between the frames and the respective values of the dimension is generated.

20 Claims, 21 Drawing Sheets

(56) References Cited

OTHER PUBLICATIONS

Charles Jacobs, Wilmot Li, Evan Schrier, David Bargeron, David Salesin, Adaptive Grid-Based Document Layout, 2003, Proceedings of ACM SIGGRAPH 2003, 22(3):838-847.*

John Lumley, Roger Gimson, Owen Rees, A Framework for Structure, Layout & Function in Documents, 2005, ACM Symposium on Document Engineering, pp. 32-41.*

Jacob Eisenstein, Jean Vanderdonckt, Angel Puerta, Applying Model-Based Techniques to the Development of UIs for Mobile Computers, 2001, Proceedings of the 6th international conference on Intelligent user interfaces 2001, pp. 69-76.*

"Non-Final Office Action", U.S. Appl. No. 13/113,238, filed Dec. 5, 2013, 16 pages.

"Final Office Action", U.S. Appl. No. 13/113,238, Apr. 10, 2014, 18 pages.

"Non-Final Office Action", U.S. Appl. No. 13/113,238, Jul. 3, 2014, 19 pages.

Eisenstein, et al.,' "Applying Model-Based Techniques to the Development of UIs for Mobile Computers", In Proceedings of IUI 2001, Jan. 2001, pp. 69-76.

Jacobs, et al.,' "Adaptive Document Layout", Communications of the ACM, vol. 47, No. 8, Available at <http://research.microsoft.com/pubs/69471/ADL-CACM.pdf>,Aug. 2004, pp. 61-66.

Jacobs, et al.,' "Adaptive Grid-Based Document Layout", ACM Transactions on Graphics, vol. 22, No. 3, Jul. 2003, pp. 838-847.

Lumley, et al.,' "A Framework for Structure, Layout & Function in Documents", In Proceedings of DocEng 2005, Nov. 2005, pp. 32-41.

* cited by examiner

FIG. 6E

ADAPTIVE CONTENT AUTHORING

BACKGROUND

Description of the Related Art

The trend toward platform-independent content transported over networks to a heterogeneous pool of devices has increased the need for authoring and display tools that exhibit enhanced flexibility with regard to the display of content on end-user platforms that offer display areas of varied size.

More specifically, heterogeneity of the device pool being used to display content now ranges from handheld phones to desktop computers driving four-foot television displays as though they were standard monitors. Unfortunately, content is frequently delivered to the end-user platform without any knowledge of the conditions of display. Even if the basic hardware configuration of an end-user system is well understood with respect to screen size, the size of a display window or display application on which a particular item of content will be displayed is usually not known in advance of delivery of content.

Traditional solutions to the problem of adapting content to variations in the size of a display window have typically followed one of three paths. First, some content is simply resized at a fixed aspect ratio. That is, each dimension of the content is resized by a common multiplier. An unfortunate result of the "fixed aspect ratio" approach is that there is commonly a loss of granularity as the resizing operation eliminates pixels in a static mathematical pattern. A second approach to adapting content to variations in the size of a display window has simply kept the content at a fixed size and allowed the user to scroll over parts outside the display window. When a window is too small for the content, such an approach is inconvenient to the user. When a display area is too large for the content, the user may suffer from a loss of perception of the importance of the content that the content author seeks to communicate. A third approach has multiplicatively adjusted the aspect ratio of the content, frequently creating distortions in the content as the content is stretched or shrunken to fit the new display parameters.

SUMMARY

Various embodiments of methods and apparatus for adaptive content authoring are disclosed. A dimensionally-linked authoring interface comprising a dimension control for associating values of a dimension to frames is displayed. A plurality of frames and input associating each of the plurality of frames to a respective value of the dimension are received. A data structure comprising the plurality of frames, the respective values of the dimension, and associations between the frames and the respective values of the dimension is generated.

BRIEF DESCRIPTION OF THE DRAWINGS

FIGS. 6A-6E depict an example interface for providing adaptive content display in one embodiment.

Figure 1:
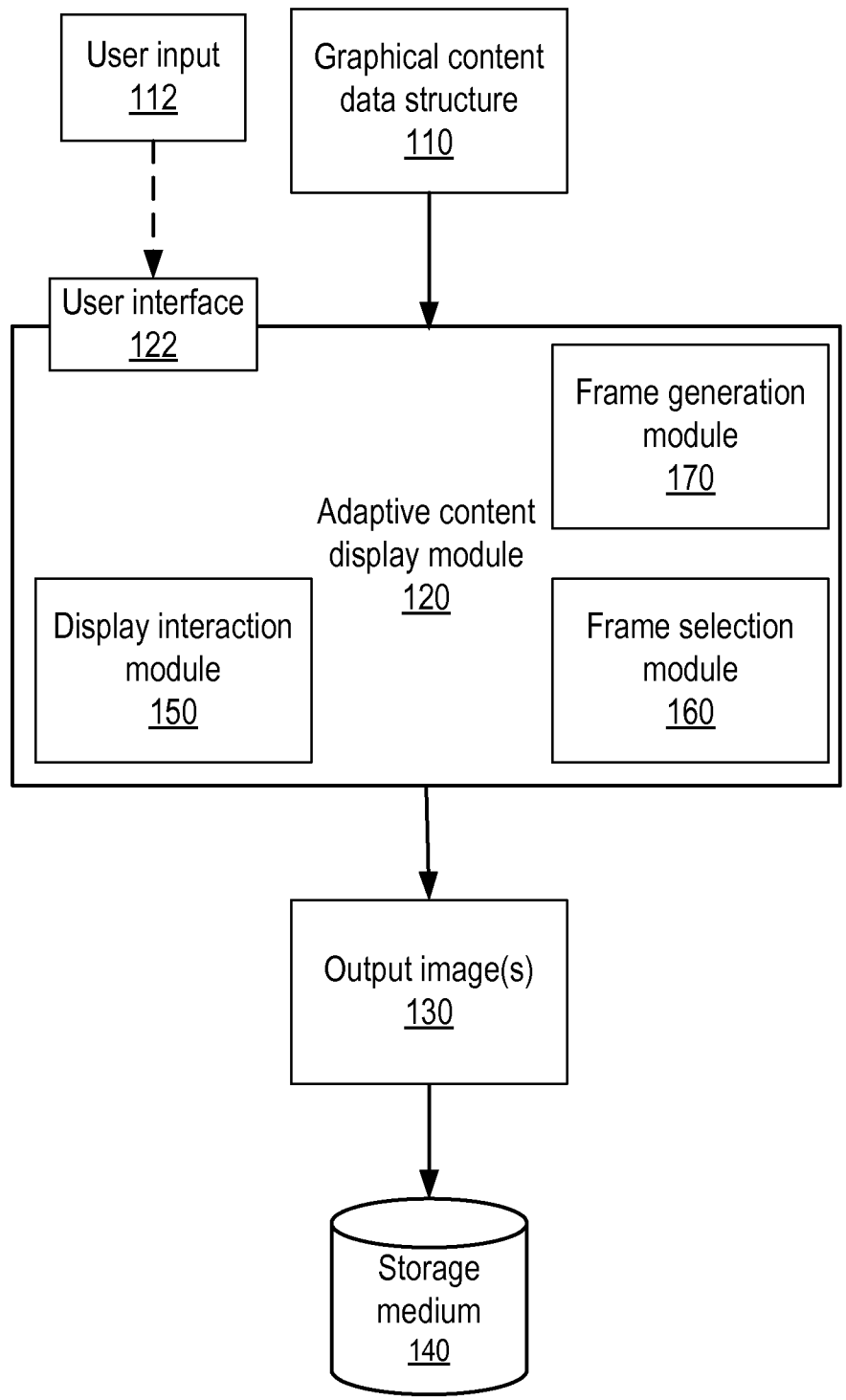
FIG. 1 illustrates a module that may implement adaptive content display according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Adaptive Content Display and Authoring.

Various embodiments of methods and apparatus for providing adaptive display and authoring of content are disclosed. In some embodiments, content for adaptive display is content provided in a set of frames of varying sizes with respect to at least a single dimension to accommodate a display area being resized in a single dimension. Display frames are frames selected for display based on a value of an analogous dimension of a display area. Some embodiments offer frames that allow for adjustment of one dimension of the display area while keeping an additional dimension of the display area constant.

In some embodiments for adaptive content display, a graphical content data structure includes a set of frames for display in a display area. An example of such a data structure is discussed below with respect to FIG. 12. Responsive to receiving an indication of a value of a current dimension of the display area, a display frame to display in the display area is determined from one or more of the set of frames based on the value of the current dimension of the display area. The display frame is displayed in the display area. In some embodiments, determining the display frame includes selecting the display frame from the set of frames. As used herein, the phrase, "display frame" refers to the frame determined for display. A module for performing adaptive content display is discussed below with respect to FIG. 1. Example operations for adaptive content display are disclosed below with respect to FIG. 2, and examples of adaptive content display are discussed below with respect to FIGS. 5A-7H.

In some embodiments, determining a display frame includes generating the display frame from a pair of frames of the set. Such embodiments may identify a first frame of the set of frames and a second frame of the set of frames. In such embodiments, a value associated with a first dimension of the first frame is less than the value of the current dimension of the display area, and a value associated with a first dimension of the second frame is greater than the value of the current dimension of the display area. Generating the display frame from the first frame and the second frame includes interpolating between content of the first frame and content of the second frame such that the display frame has a first dimension equal to the value. Example operations for generating a display frame are disclosed below with respect to FIG. 3.

In some embodiments, generating the display frame further includes adjusting a position of a common content element between a position relative to a background element in the first frame and a position relative to a background element in the second frame. In some embodiments, generating the display frame also includes integrating into the display frame a content item that is not present in the first frame. In some embodiments, a common content element may be rendered in a size in the display frame equal to the size in the first frame. In some embodiments, the indication of the value of the current dimension of the display area is received from an application generating the display area. Example operations for generating a display frame are disclosed below with respect to FIG. 4.

In some embodiments for adaptive content authoring, a dimensionally-linked authoring interface includes a dimension control for associating values of a dimension to frames. A set of frames and input associating each of the set of frames to a respective value of the dimension is received. A module for performing adaptive content authoring is discussed below with respect to FIG. 8, and operations for performing adaptive content authoring are discussed with respect to FIG. 9. Some embodiments display the dimensionally-linked authoring interface with an interpolation control for specifying rules governing generation of display frames by interpolation between frames of the set. Such embodiments are configured to receive input specifying a rule for generating a display frame from a first frame and a second frame of the set of frames. The rule for generating the display frame controls an interpolation between content of the first frame and content of the second frame to generate the display frame. Operations for performing adaptive content authoring with interpolative rules are discussed below with respect to FIGS. 10-11, and examples of an interface for adaptive content authoring are discussed below with respect to FIGS. 13-14E.

In some embodiments, a value of a dimension associated with the first frame is less than the value of the dimension associated with the display frame, and a value of the dimension associated with the second frame is greater than the value of the dimension associated with the display frame. The rule is associated with one or more frames of the set. Some embodiments generate or generate and transmit a data structure including the plurality of frames and the rule. Some embodiments are configured to receive input specifying instructions for adjusting a position of a common content element between a position relative to a background element in the first frame and a position relative to a background element in the second frame. Some embodiments are configured to receive input specifying a common value of another dimension for each of the set of frames. Some embodiments are configured to receive input specifying rendering a common content element in a size in the display frame equal to the size in the first frame. Some embodiments are configured to receive input specifying integrating into the display frame a content item that is not present in the first frame.

Some embodiments may include a means for adaptive content authoring and adaptive content display. For example, an adaptive content display module may receive as input a dimension of a display area and may select a display frame for display in the display area or may generate such a frame, as described herein. The adaptive content display module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying a dimension of a display area and selecting a frame for display in the display area or may generate such a frame, as described herein. Other embodiments of the adaptive content display module may be at least partially implemented by hardware circuitry and/or firmware stored, for example, in a non-volatile memory.

Likewise, an adaptive content authoring module may receive as input a value of a dimension of a display area and a frame to be associated with that value of the dimension of the display area, as described herein. The adaptive content authoring module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving as input a value of a dimension of a display area and a frame to be associated with that value of the dimension of the display area, as described herein. Other embodiments of the adaptive content display module may be at least partially implemented by hardware circuitry and/or firmware stored, for example, in a non-volatile memory.

Example Implementation of Adaptive Content Display Module

Figure 15:
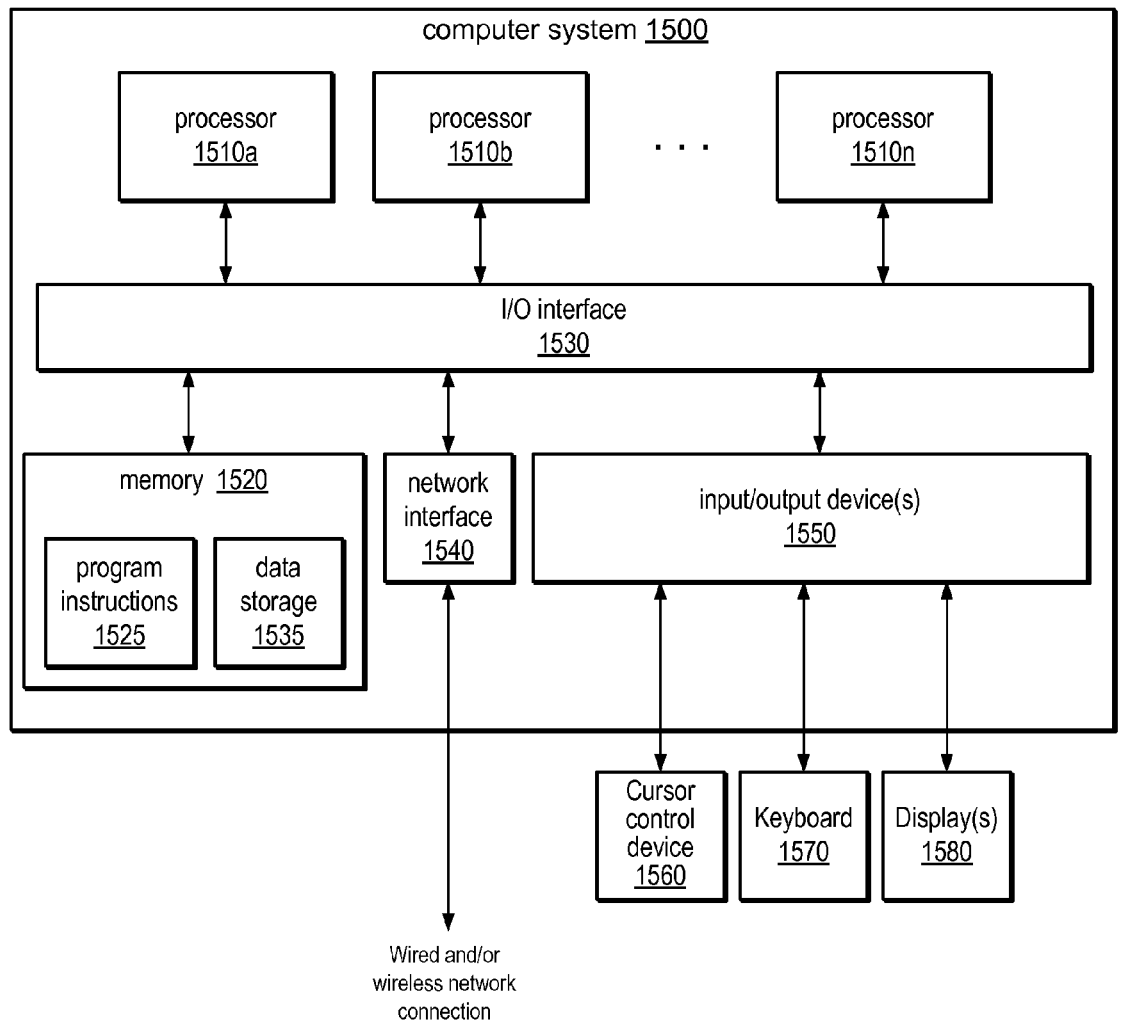
FIG. 15 illustrates an example computer system that may be used in embodiments.

FIG. 1 illustrates an adaptive content display module that may implement one or more of the adaptive content display techniques and tools illustrated in FIGS. 2-7E. Adaptive content display module 120 may, for example, implement one or more of presentation of an adaptive content display area, display frame selection, or display frame generation. FIG. 15 illustrates an example computer system on which embodiments of adaptive content display module 120 may be implemented. In one embodiment, adaptive content display module 120 receives as input one or more graphical content data structures 110. An example graphical content data structure is discussed below with respect to FIG. 12. Adaptive content display module 120 may receive user input 112 including an indication of a value of a dimension of a display area. Adaptive content display module 120 then determines a display frame from a plurality of display frames contained in graphical content data structure 110, according to the value received as user input 112 via user interface 122. Such a user interface may be a display window as described below with respect to FIGS. 6A-6E. In some embodiments, an indication of a value of a dimension of a display area may be received without user input. For example, some embodiments of adaptive content display module 120 may receive display parameters including an indication of a value of a dimension of a display area directly from an operating system of a system on which adaptive content display module 120 is executing.

The operating system may activate adaptive content display module 120. Adaptive content display module 120 generates as output one or more output images 130. Output image(s) 130 may, for example, be stored to a storage medium 140, such as system memory, a disk drive, DVD, CD, etc, for use by a display system associated with a computer on which adaptive content display module 120 is executing.

In some embodiments, adaptive content display module 120 may provide a user interface 122 via which a user may interact with the Adaptive content display module 120, for example to provide input indicating a value of a dimension of a display area, as described herein. In some embodiments, the user interface may provide user interface elements whereby the user may select options including, but not limited to, the indication of the dimension, or layers of information to be presented in the interface (e.g., text only, graphics only, or text and graphics).

In some embodiments, adaptive content display module 120 includes a frame selection module 160 for selecting a frame from a set of frames as a display frame, as described above. In some embodiments, adaptive content display module 120 also includes a frame generation module 170 for interpolatively generating a display frame from a pair of frames of the set of frames, as described above. Likewise, in some embodiments, adaptive content display module 120 includes a display interaction module 150 for receiving indications of values of dimensions of display areas, as described above, and for providing output images 130 to display adapters or display systems of computers on which adaptive content display module 120 is executing, as described above.

Example Adaptive Content Display Operations

Figure 2:
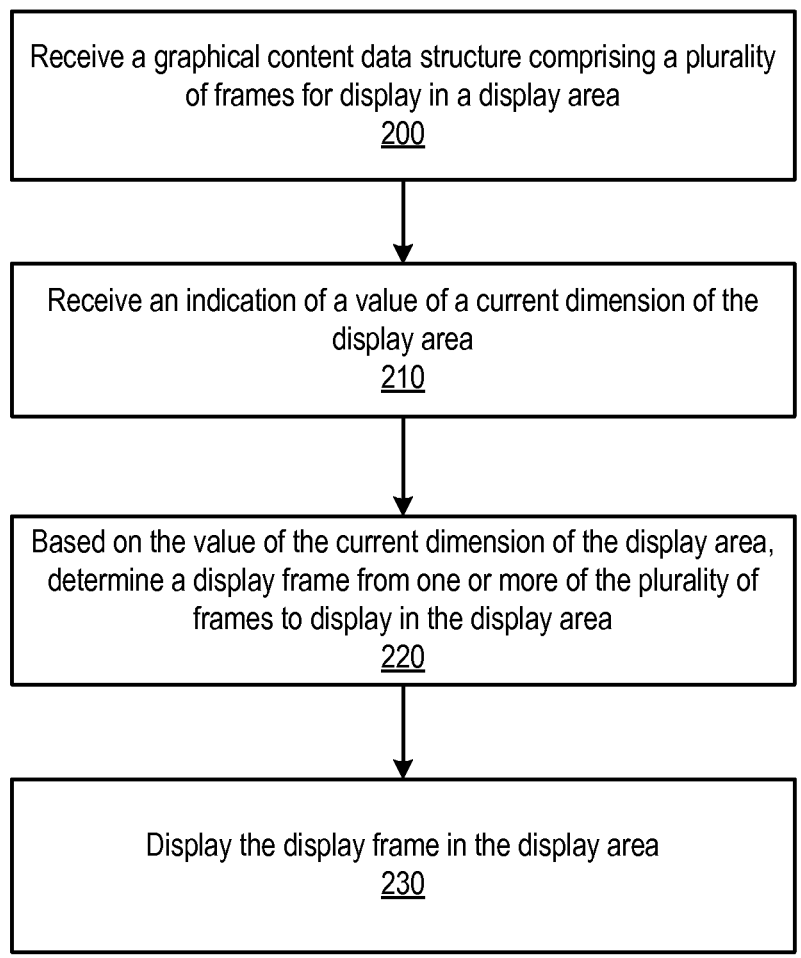
FIG. 2 depicts a high-level logical flowchart of operations performed in a method for providing adaptive content display according to some embodiments.

FIG. 2 depicts a high-level logical flowchart of operations performed in a method for providing adaptive content display according to some embodiments. A graphical content data structure comprising a plurality of frames for display in a display area is received (block 200). An indication of a value of a current dimension of the display area is received (block 210). Based on the value of the current dimension of the display area, a display frame from one or more of the plurality of frames to display in the display area is determined (block 220). The display frame is displayed in the display area (block 230).

Figure 3:
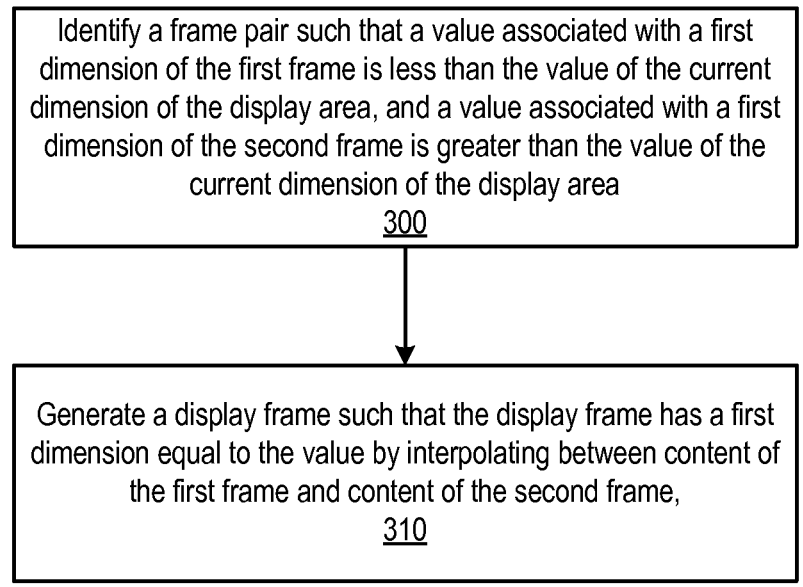
FIG. 3 illustrates a high-level logical flowchart of interpolative frame generation operations performed in a method for providing adaptive content display according to some embodiments.

FIG. 3 illustrates a high-level logical flowchart of interpolative frame generation operations performed in a method for providing adaptive content display according to some embodiments. The operations portrayed in FIG. 3 will be employed in some embodiments and may be entirely omitted in others. A frame pair such that a value associated with a first dimension of the first frame is less than the value of the current dimension of the display area, and a value associated with a first dimension of the second frame is greater than the value of the current dimension of the display area, is identified (block 300). A display frame such that the display frame has a first dimension equal to the value is generated by interpolating between content of the first frame and content of the second frame (block 310).

Figure 4:
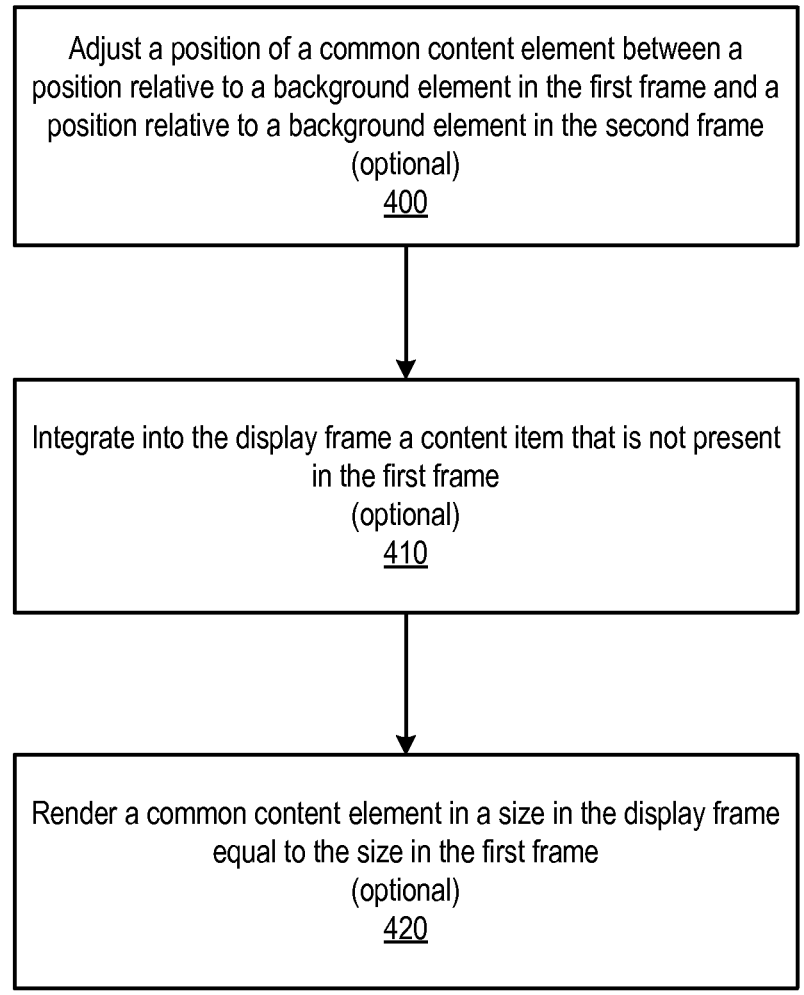
FIG. 4 depicts a high-level logical flowchart of optional interpolative frame generation operations performed in a method for providing adaptive content display according to some embodiments.

FIG. 4 depicts a high-level logical flowchart of optional interpolative frame generation operations performed in a method for providing adaptive content display according to some embodiments. All of the operations portrayed in FIG. 4 are optional, and embodiments may perform some (including performance in an order other than listed) and entirely omit others without departing from the scope and intent of the present disclosure. A position of a common content element is adjusted between a position relative to a background element in the first frame and a position relative to a background element in the second frame (block 400). A content item that is not present in the first frame is integrated into the display frame (block 410). A common content element is rendered in a size in the display frame equal to the size in the first frame (block 420).

Example Content Adaptation Result

Figure 5A:
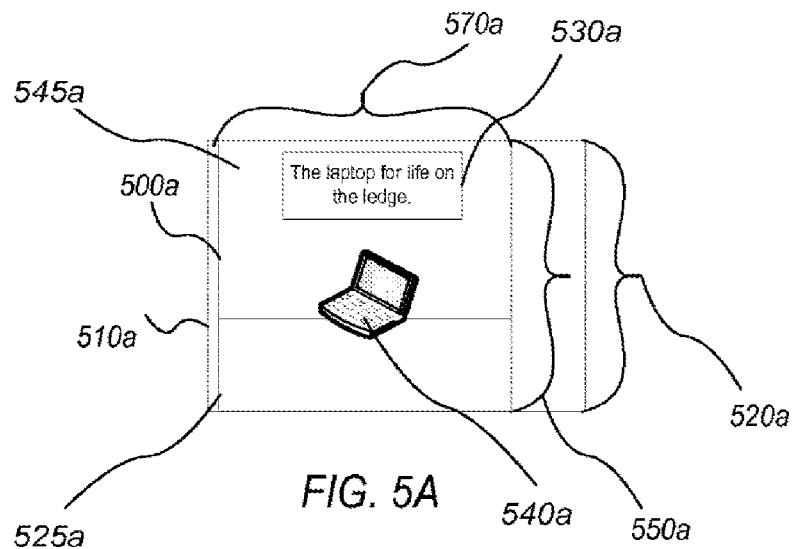
FIGS. 5A-5B illustrate an example of results of one embodiment of adaptive content display.
Figure 5B:
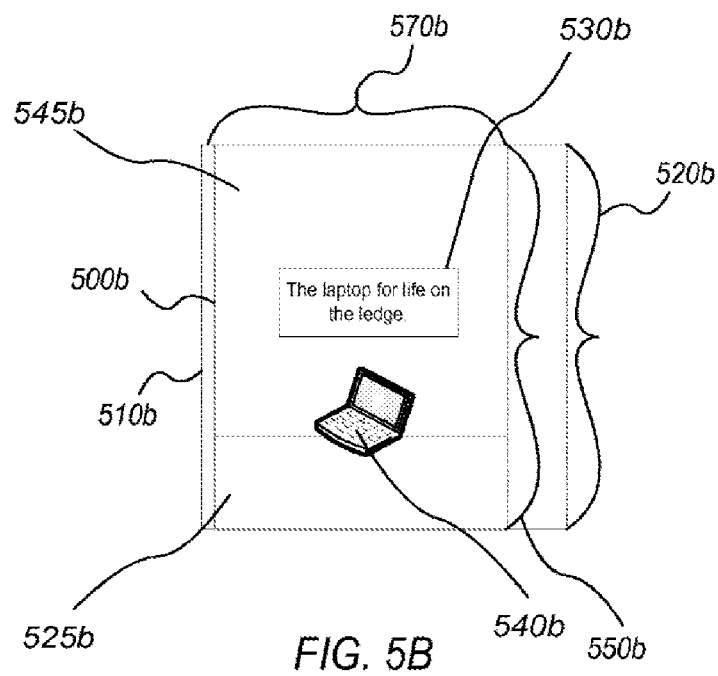

FIGS. 5A-5B illustrate an example of results of one embodiment of adaptive content display. In FIG. 5A, a first display frame 500a is shown in a first display area 510a. First display frame 500a is selected based on a dimension 520a of first display area 510a. In the example depicted with respect to FIG. 5A, first display frame 500a is selected on the basis of identity between a first dimension 550a of first display frame 500a and a first dimension 520a of first display area 510a. First display frame 500a also has a second dimension 570a.

One of skill in the art will readily comprehend in light of having read the present disclosure that embodiments will vary in terms of the relationship between a dimension of a display area, such as first dimension 550a of first display frame 500a, and a dimension of a display frame displayed in the display area, such as first dimension 550a of first display frame 500a, without departing from the scope of the present disclosure.

For example, other embodiments define a relationship between a dimension of a display area a dimension of a display frame displayed in the display area as a fixed percentage of the dimension of the display area. Alternatively, other embodiments define a relationship between a dimension of a display area and a dimension of a display frame displayed in the display area as a variable percentage of the dimension of the display area, where the variable percentage depends on other factors, such as other content displayed simultaneously with the display frame displayed in the display area or fees paid by a party paying for the display frame to be displayed in the display area.

In FIG. 5B, a second display frame 500b is shown in a second display area 510b. Second display frame 500b is selected based on a dimension 520b of first display area 510b. In the example depicted with respect to FIG. 5B, second display frame 500b is selected on the basis of identity between a first dimension 550b of second display frame 500b and a first dimension 520b of second display area 510b. Second display frame 500b also has a second dimension 570b.

The pair of FIG. 5A and FIG. 5B illustrates a basic embodiment of adaptive display of graphical content as described herein. In the example portrayed in FIG. 5A and FIG. 5B, a dimension 520a-520b of a display area 510a-510b is variable and display frames 500a-500b are determined for display in display area 510a-510b based on dimension 520a-520b of a display area 510a-510b, with the size of display frames 500a-500b determined for display varying in a single dimension in response to change in the same dimension of display area 510a-510b. One of skill in the art will further notice several additional features of embodiments present in the pair of FIG. 5A and FIG. 5B. First, in the embodiment portrayed in the pair of FIG. 5A and FIG. 5B, second dimension 570a and second dimension 570b are identical. One of skill in the art will readily comprehend in light of having read the present disclosure, that embodiments will vary in terms of the relationship between second dimensions of display frames, such as second dimension 570a and second dimension 570b of first display frame 500a and second display frame 500b, respectively. Such relationships may be constant or may vary on the basis of a variety of factors without departing from the scope and intent of the disclosure provided herein.

Additionally, sizes and positional relationships of first content element 525a, second content element 530a and third content element 540a of first display frame 500a are identical to the sizes and positional relationships of first content element 525b, second content element 530b and third content element 540b of second display frame 500b, while the size of fourth content element 545a of first display frame 500a is different from the size of fourth content element 545b of second display frame 500b. One of skill in the art will readily comprehend in light of having read the present disclosure, that embodiments will vary in terms of the relationship between the sizes and positions of display elements without departing from the scope and intent of the disclosure provided herein.

Example Adaptive Content Display Interface

Figure 6A:

FIGS. 6A-6E depict an example interface for providing adaptive content display in one embodiment. FIG. 6A illustrates a display window of an application 610a displaying a display frame 600a having a first dimension 650a and a second dimension 670a. As discussed above, display frame 600a is determined based on a dimension 620a of display window 610a.

Figure 6B:
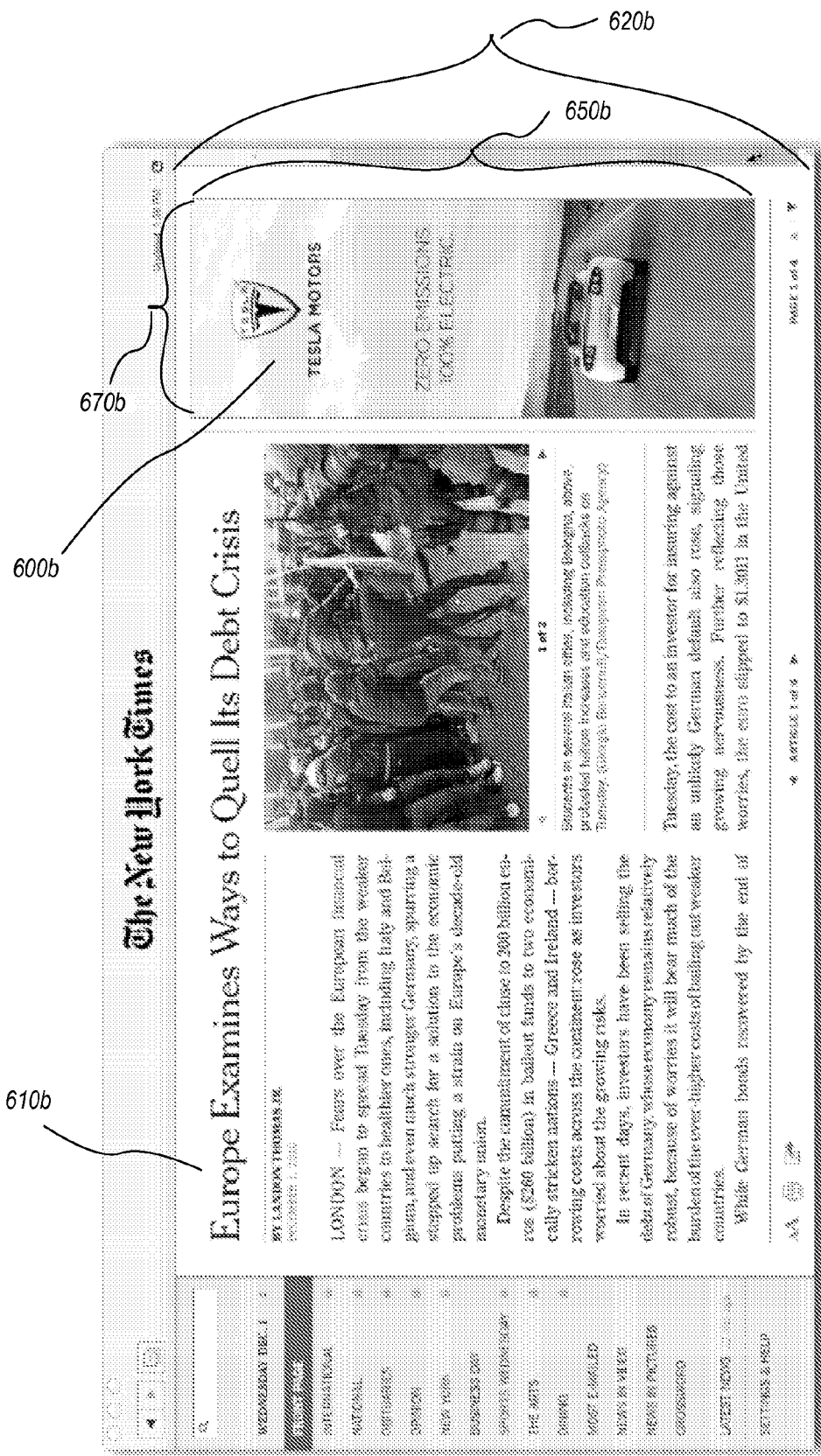

FIG. 6B illustrates a display window of an application 610b displaying a display frame 600b having a first dimension 650b and a second dimension 670b. As discussed above, display frame 600b is determined based on a dimension 620b of display window 610b. One of skill in the art will note that second dimension 670b is identical to second dimension 670a of FIG. 6A, while first dimension 650b is different from first dimension 650a of FIG. 6A, reflecting the difference between dimension 620b of display window 610b and dimension 620a of display window 610a of FIG. 6A.

Figure 6C:
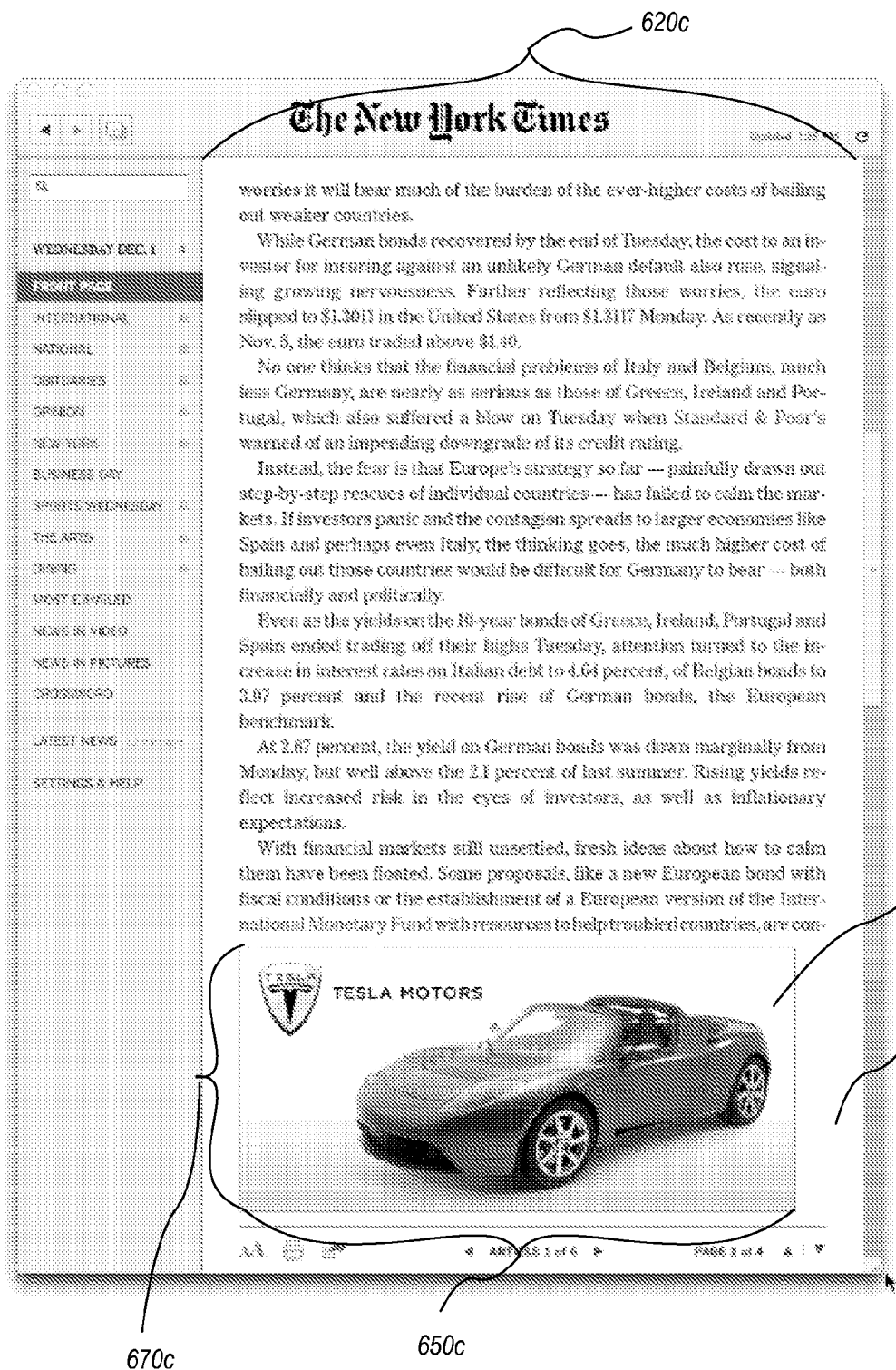

FIG. 6C illustrates a display window of an application 610c displaying a display frame 600c having a first dimension 650c and a second dimension 670c. As discussed above, display frame 600c is determined based on a dimension 620c of display window 610c.

Figure 6D:
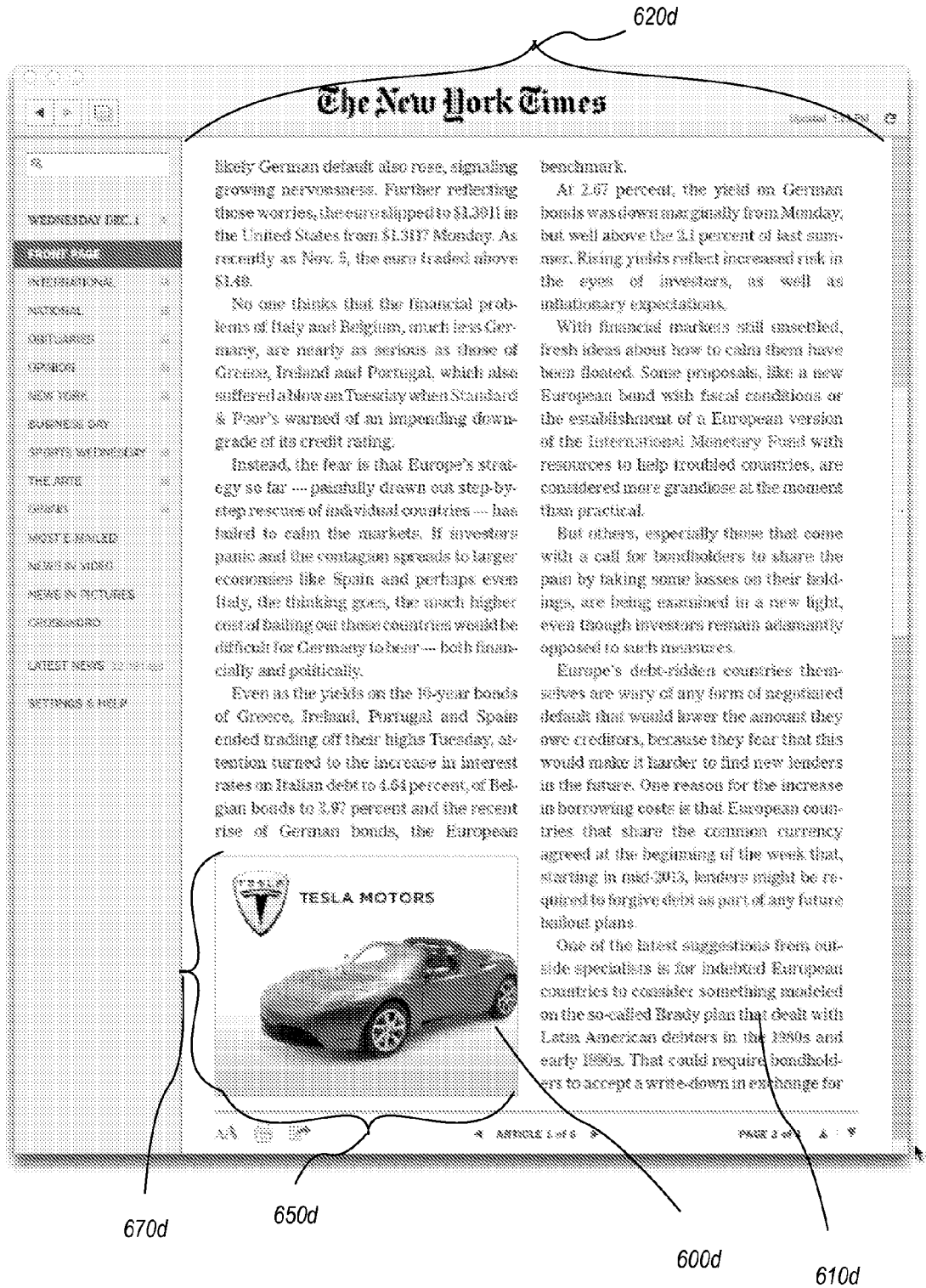

FIG. 6D illustrates a display window of an application 610d displaying a display frame 600d having a first dimension 650d and a second dimension 670d. As discussed above, display frame 600d is determined based on a dimension 620d of display window 610d. One of skill in the art will note that second dimension 670d is identical to second dimension 670c of FIG. 6C, while first dimension 650d is different from first dimension 650c of FIG. 6C, reflecting the difference between dimension 620d of display window 610d and dimension 620c of display window 610c of FIG. 6C. One of skill in the art will further notice that a position of display frame 600d with respect to display window 610d (bottom left corner half-width) is different from a position of display frame 600c with respect to display window 610c of FIG. 6C (bottom center full width). In addition to supporting adaptation of size of a display frame, some embodiments support adaptation of position of a display frame with respect to a window without departing from the scope and intent of the present disclosure.

Figure 6E:
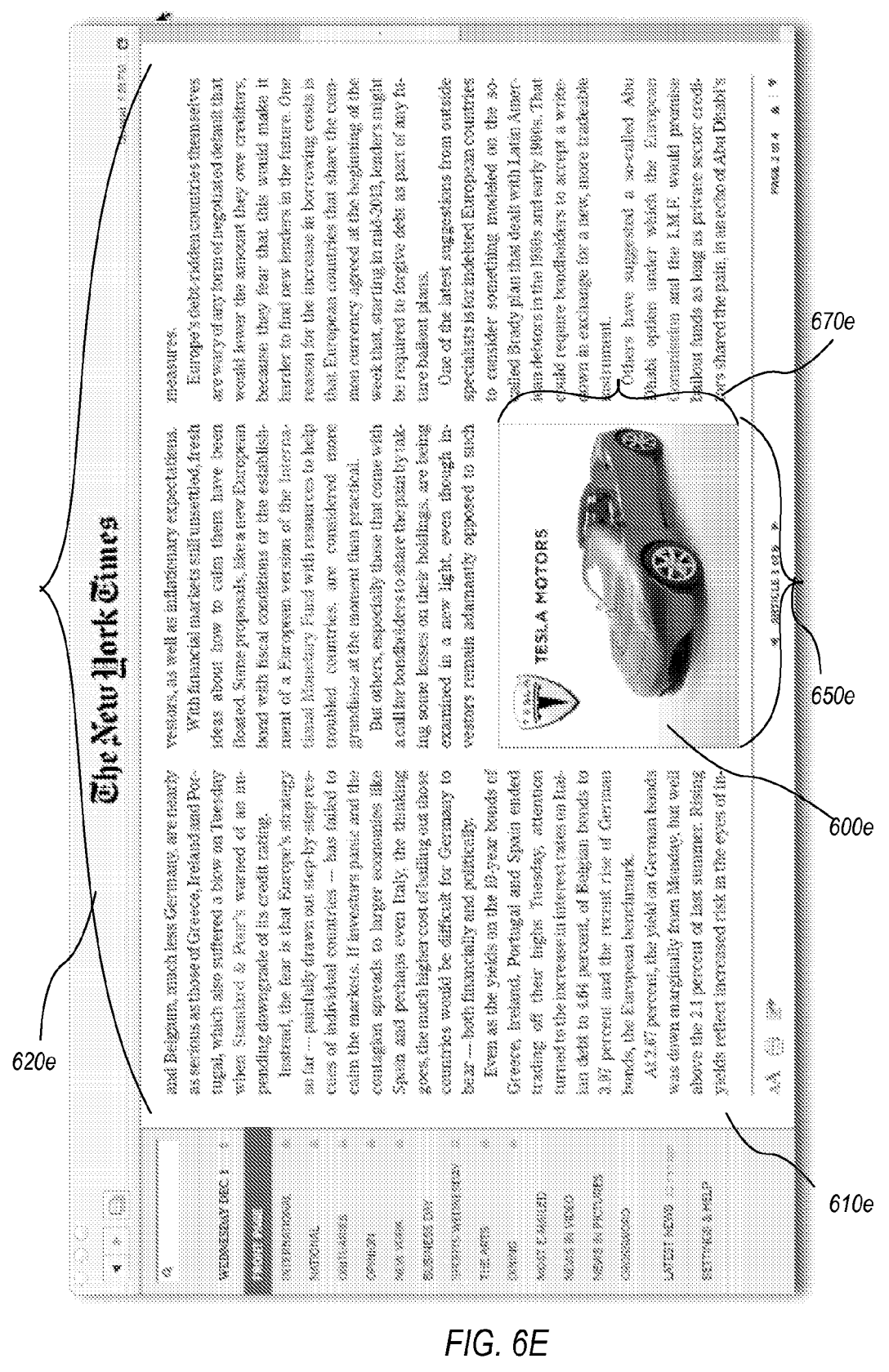

FIG. 6E illustrates a display window of an application 610e displaying a display frame 600e having a first dimension 650e and a second dimension 670e. As discussed above, display frame 600e is determined based on a dimension 620e of display window 610e. One of skill in the art will note that second dimension 670e is identical to second dimension 670c of FIG. 6C and second dimension 670d of FIG. 6D, while first dimension 650e is different from first dimension 650c of FIG. 6C and first dimension 650d of FIG. 6D, reflecting the difference between dimension 620e of display window 610e and dimension 620c of display window 610c of FIG. 6C or dimension 620d of display window 610d of FIG. 6D. One of skill in the art will further notice that a position of display frame 600e with respect to display window 610e (bottom center ⅓ width) is different from a position of display frame 600c with respect to display window 610c of FIG. 6C (bottom center full-width) or a position of display frame 600d with respect to display window 610d of FIG. 6D (bottom left corner half-width). As discussed above, in addition to supporting adaptation of size of a display frame, some embodiments support adaptation of position of a display frame with respect to a window without departing from the scope and intent of the present disclosure.

Example Content Adaptations

Figure 7A:
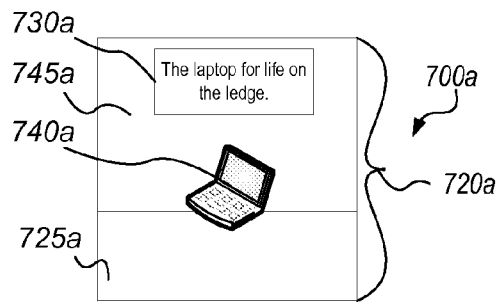
FIGS. 7A-7E illustrate example content display content display adaptations according to some embodiments.

FIGS. 7A-7E illustrate example content display content display adaptations that may result from interpolation operations according to some embodiments. In one embodiment, FIGS. 7A-7E represent various frames determined by an embodiment in response to indications of a dimension of a display window. Such frames may either be selected from an adaptive display data structure or generated from existing frames as described above with respect to FIG. 3-FIG. 4. FIG. 7A will be used herein as a baseline for comparison to FIGS. 7B-7E to discuss adaptations of a frame that may be presented in frames of an adaptive display data structure or created in the process of generating a display frame from existing frames as described above with respect to FIG. 3-FIG. 4.

In FIG. 7A, a frame 700a is shown. Frame 700a has a first dimension 720a. Frame 700a contains a first foreground content element 730a, a second foreground content element 740a, a first background element 725a and a second background content element 745a.

Figure 7B:
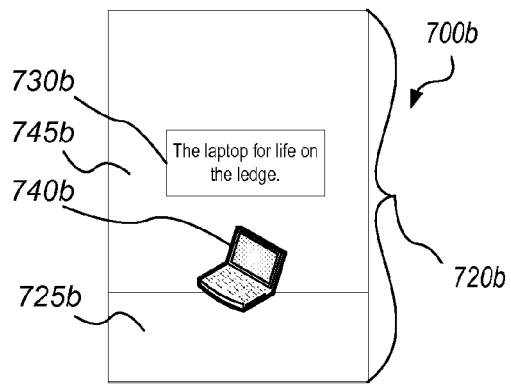

In FIG. 7B, a frame 700b is shown. Frame 700b has a first dimension 720b. Frame 700b contains a first foreground content element 730b, a second foreground content element 740b, a first background element 725b and a second background content element 745b. Comparing frame 700b to frame 700a, one of skill in the art will note that embodiments support the ability to select or generate frames differing as to dimensions 720a and 720b while holding constant the relative positions and sizes of first foreground content elements 730a and 730b, second foreground content elements 740a and 740b, and first background elements 725a and 725b, and while allowing sizes of second background content elements 745a and 745b to vary between frames 700a and 700b to accommodate differences in first dimensions 720a and 720b.

Figure 7C:
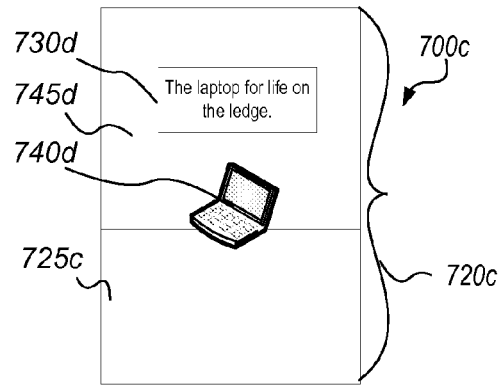

In FIG. 7C, a frame 700c is shown. Frame 700c has a first dimension 720c. Frame 700c contains a first foreground content element 730c, a second foreground content element 740c, a first background element 725c and a second background content element 745c. Comparing frame 700c to frame 700a, one of skill in the art will note that embodiments support the ability to select or generate frames differing as to dimensions 720a and 720c while holding constant the relative positions of first foreground content elements 730a and 730c, second foreground content elements 740a and 740c, and first background elements 725a and 725c, while allowing sizes of second background content elements 745a and 745c and first background elements 725a and 725c to vary between frames 700a and 700c to accommodate differences in first dimensions 720a and 720c.

Figure 7D:
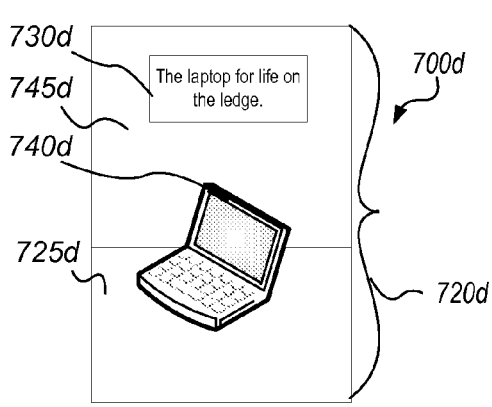

In FIG. 7D, a frame 700d is shown. Frame 700d has a first dimension 720d. Frame 700d contains a first foreground content element 730d, a second foreground content element 740d, a first background element 725d and a second background content element 745d. Comparing frame 700d to frame 700a, one of skill in the art will note that embodiments support the ability to select or generate frames differing as to dimensions 720a and 720d and containing sizes and positions of first foreground content elements 730a and 730d, second foreground content elements 740a and 740d, first background elements 725a and 725d, and second background content elements 745a and 745d that vary between frames 700a and 700d to accommodate differences in first dimensions 720a and 720d.

Figure 7E:
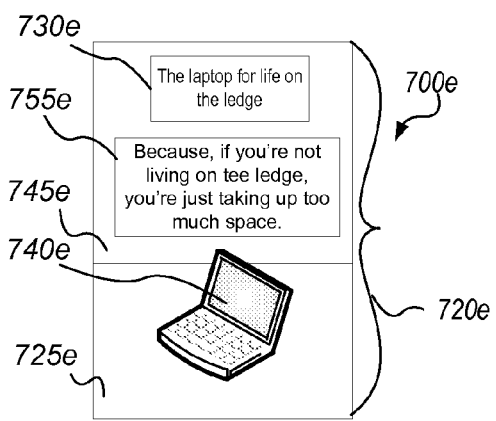

In FIG. 7E, a frame 700e is shown. Frame 700e has a first dimension 720e. Frame 700e contains a first foreground content element 730e, a second foreground content element 740e, a first background element 725e and a second background content element 745e. Comparing frame 700e to frame 700a, one of skill in the art will note that embodiments support the ability to select or generate frames differing as to dimensions 720a and 720e and containing sizes and positions of first foreground content elements 730a and 730e, second foreground content elements 740a and 740e, first background elements 725a and 725e, and second background content elements 745a and 745e that vary between frames 700a and 700e to accommodate differences in first dimensions 720a and 720e and allow the addition of a third foreground content element 755e in frame 700e.

Example Adaptive Content Authoring Module

Figure 8:
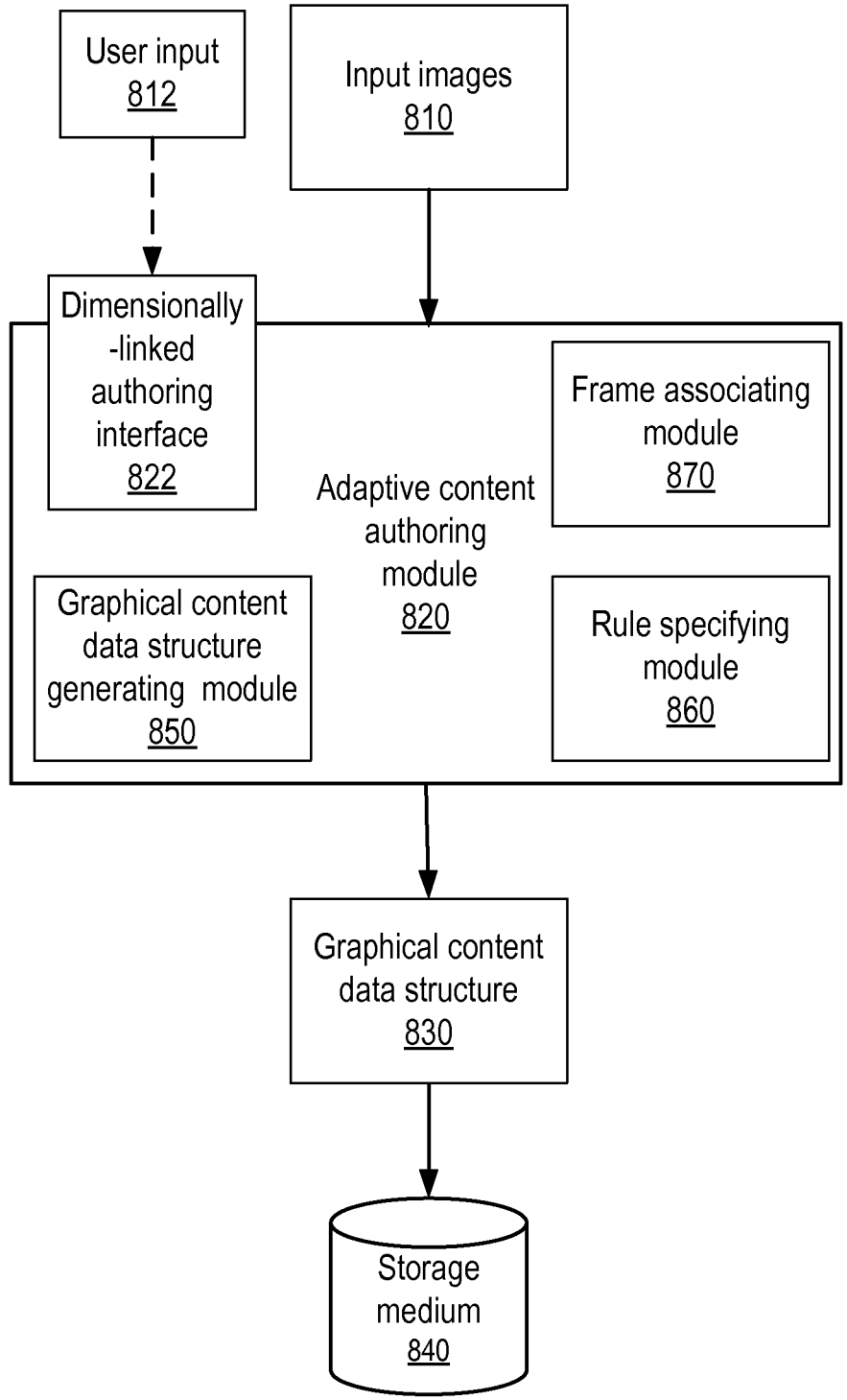
FIG. 8 depicts a module that may implement adaptive content authoring according to some embodiments.

FIG. 8 illustrates an adaptive content authoring module that may implement one or more of the adaptive content authoring and techniques and tools for associating frames to dimensions illustrated in FIGS. 9 through 14C. Adaptive content authoring module 820 may, for example, implement one or more of a dimensionally-linked authoring interface including a dimension control for associating values of a dimension to frames and receiving and displaying controls for receiving a plurality of frames and input associating each of the plurality of frames to a respective value of the dimension. Frames are associated with values of the dimension by a frame associating module 870.

Adaptive content authoring module 820 may also, for example, implement an authoring interface for receiving input specifying a rule for generating a display frame from a first frame and a second frame of the plurality of frames and associating the rule with one or more frames of the plurality of frames. Rules are encoded by a rule specifying module 860. FIG. 15 illustrates an example computer system on which embodiments of adaptive content authoring module 820 may be implemented. Adaptive content authoring module 820 receives as input one or more input images 810, such as the frames discussed with respect to FIGS. 7A-7E. Adaptive content authoring module 820 may receive user input 812 input associating each of the plurality of frames to a respective value of the dimension or specifying a rule for generating a display frame from a first frame and a second frame of the plurality of frames and associating the rule with one or more frames of the plurality of frames. Adaptive content authoring module 820 then associates the frames with rules and with values of the dimension, according to user input 812 received via a user interface such as a dimensionally linked authoring interface 822, using the tools and techniques described below.

The user may specify generation of a graphical content data structure containing the frames, the rules, and information for associating rules to frames and frames to values of the dimension. Adaptive content authoring module 820 generates as output one or more graphical content data structures 830 via a graphical content data structure generating module 850. In some embodiments, graphical content data structure generating module 850 may be configured to interpolatively generate frames according to the rules received from rule specifying module 860 and include such interpolatively generated frames in graphical content data structures 830. Such interpolative generation of frames may be undertaken by graphical content data structure generating module 850 using operations similar to those discussed above with respect to FIG. 3-4, except that the values of frame dimensions for frame generation are either interpolatively determined by adaptive content authoring module 820 or received as user input 812 through dimensionally linked authoring interface 822. Graphical content data structures 830 may, for example, be stored to a storage medium 840, such as system memory, a disk drive, DVD, CD, etc.

Example Adaptive Content Authoring Operations

Figure 9:
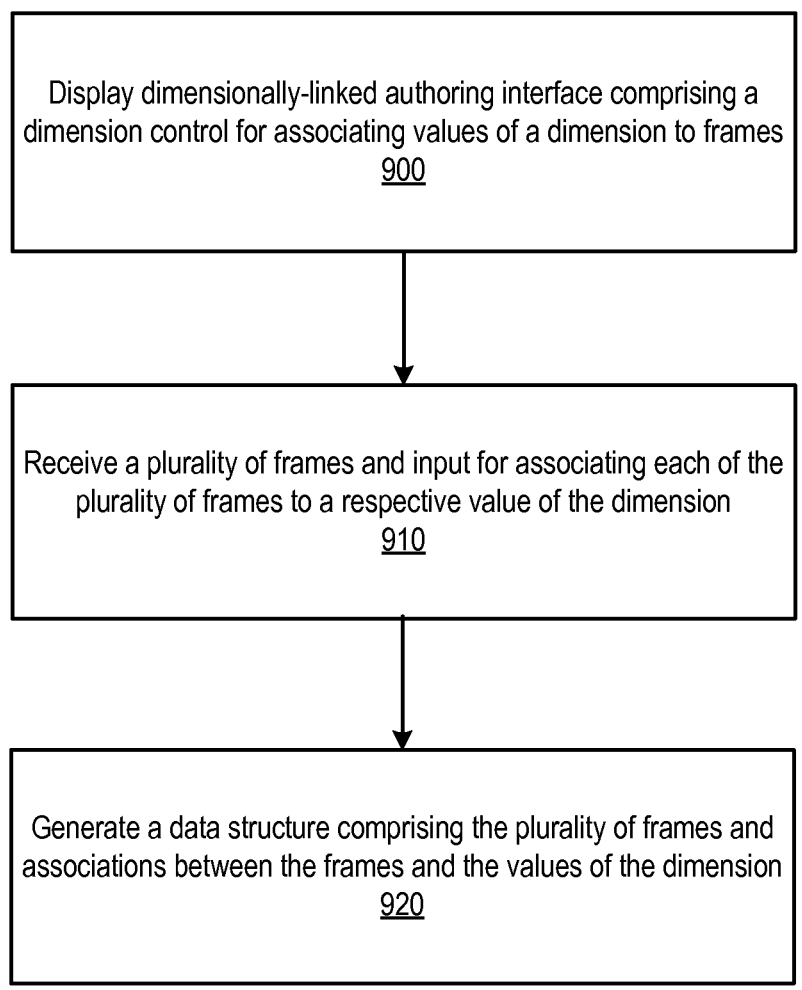
FIG. 9 illustrates a high-level logical flowchart of operations performed in a method for providing adaptive content authoring according to some embodiments.

FIG. 9 illustrates a high-level logical flowchart of operations performed in a method for providing adaptive content authoring according to some embodiments. A dimensionally-linked authoring interface comprising a dimension control for associating values of a dimension to frames is displayed (block 900). A plurality of frames and input associating each of the plurality of frames to a respective value of the dimension is received (block 910). A data structure comprising the plurality of frames and associations between the frames and the values of the dimension is generated (block 920).

Figure 10:
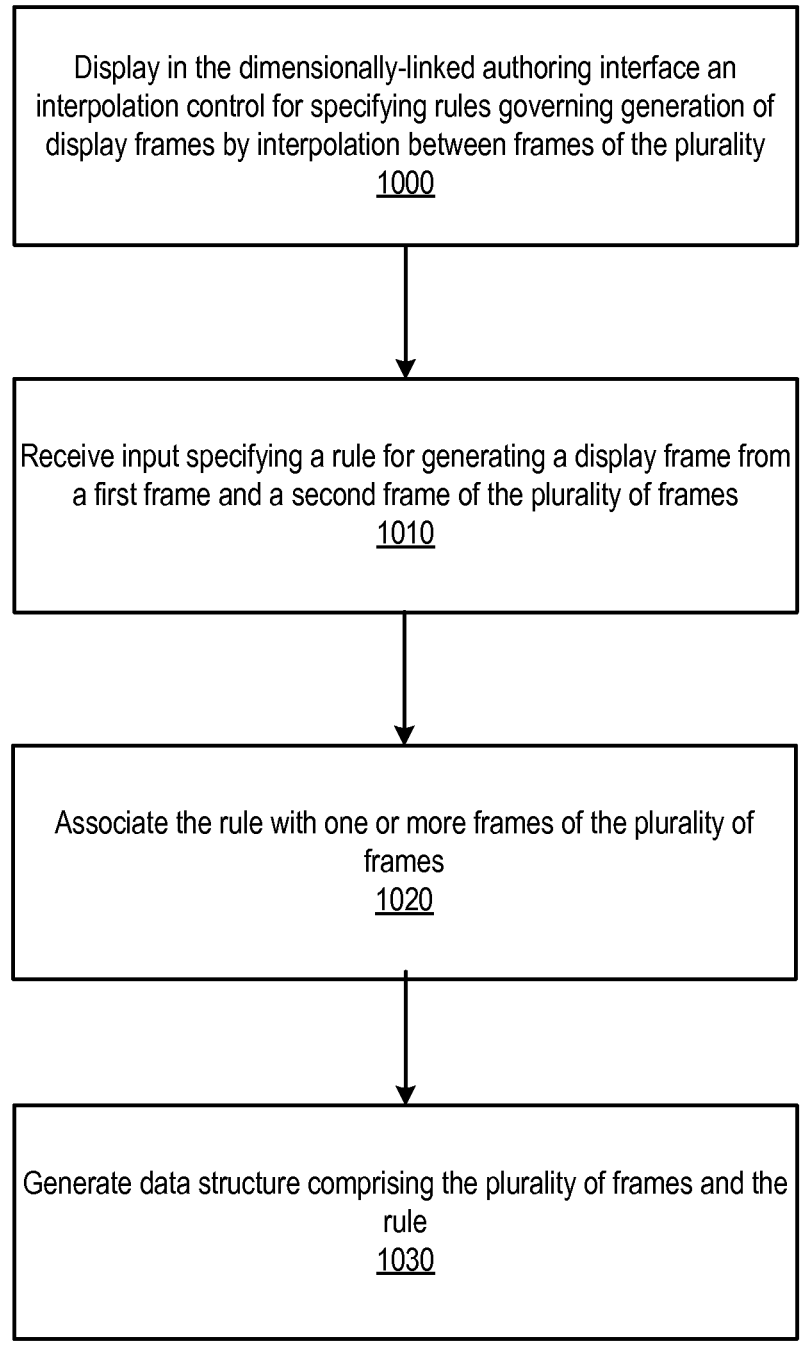
FIG. 10 depicts a high-level logical flowchart of interpolative frame generation rule authoring operations performed in a method for providing adaptive content authoring according to some embodiments.

FIG. 10 depicts a high-level logical flowchart of interpolative frame generation rule authoring operations performed in a method for providing adaptive content authoring according to some embodiments. An interpolation control for specifying rules governing generation of display frames by interpolation between frames of the plurality is displayed in the dimensionally-linked authoring interface (block 1000). Input specifying a rule for generating a display frame from a first frame and a second frame of the plurality of frames is received (block 1010). The rule is associated with one or more frames of the plurality of frames (block 1020). A data structure comprising the plurality of frames and the rule is generated (block 1030).

Figure 11:
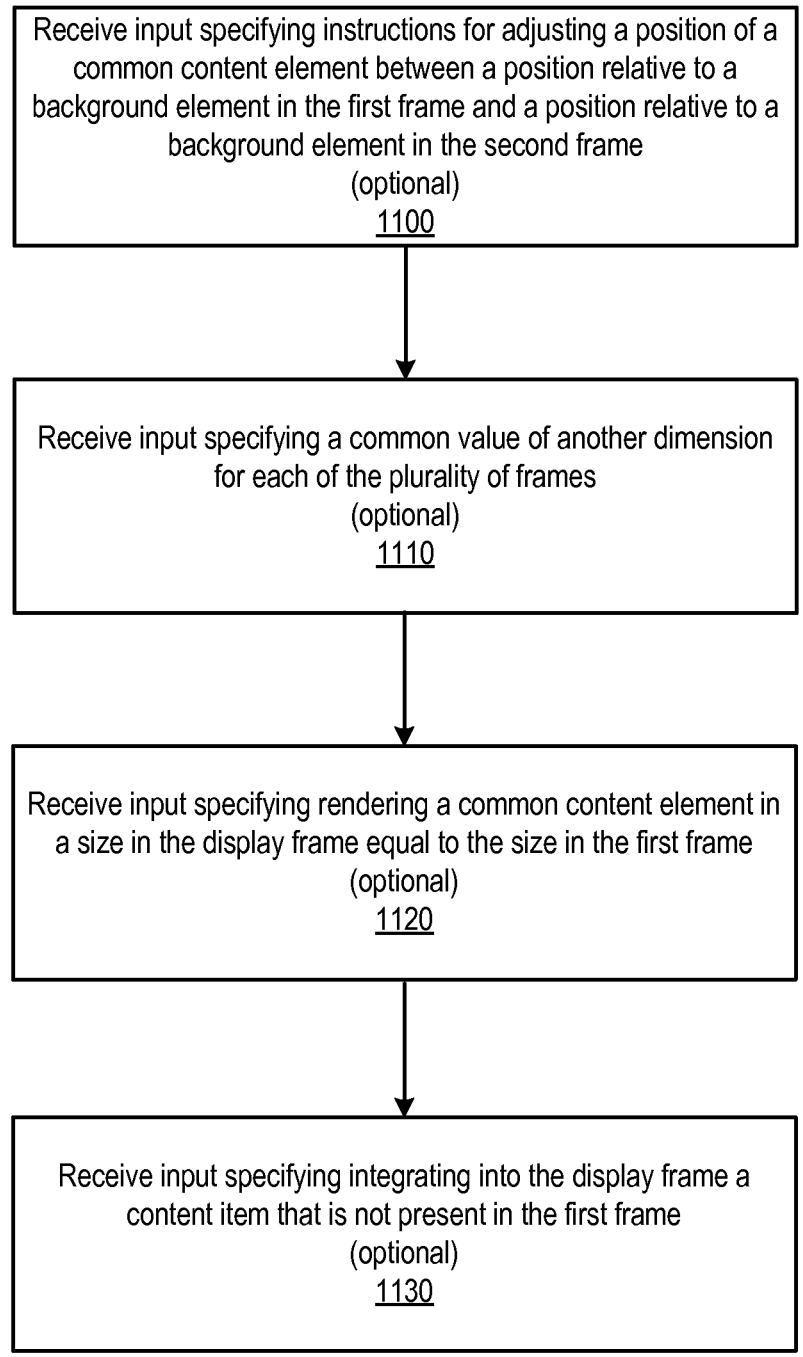
FIG. 11 illustrates a high-level logical flowchart of optional interpolative frame generation rule authoring operations performed in a method for providing adaptive content authoring according to some embodiments.

FIG. 11 illustrates a high-level logical flowchart of optional interpolative frame generation rule authoring operations performed in a method for providing adaptive content authoring according to some embodiments. All of the operations portrayed in FIG. 11 are optional, and embodiments may perform some (including performance in an order other than listed) and entirely omit others without departing from the scope and intent of the present disclosure. Input specifying instructions for adjusting a position of a common content element between a position relative to a background element in the first
frame and a position relative to a background element in the second frame is received (block 1100). Input specifying a common value of another dimension for each of the plurality of frames is received (block 1110). Input specifying rendering a common content element in a size in the display frame equal to the size in the first frame is received (block 1120). Input specifying integrating into the display frame a content item that is not present in the first frame is received (block 1130).

Example Adaptive Content Data Structure

Figure 12:
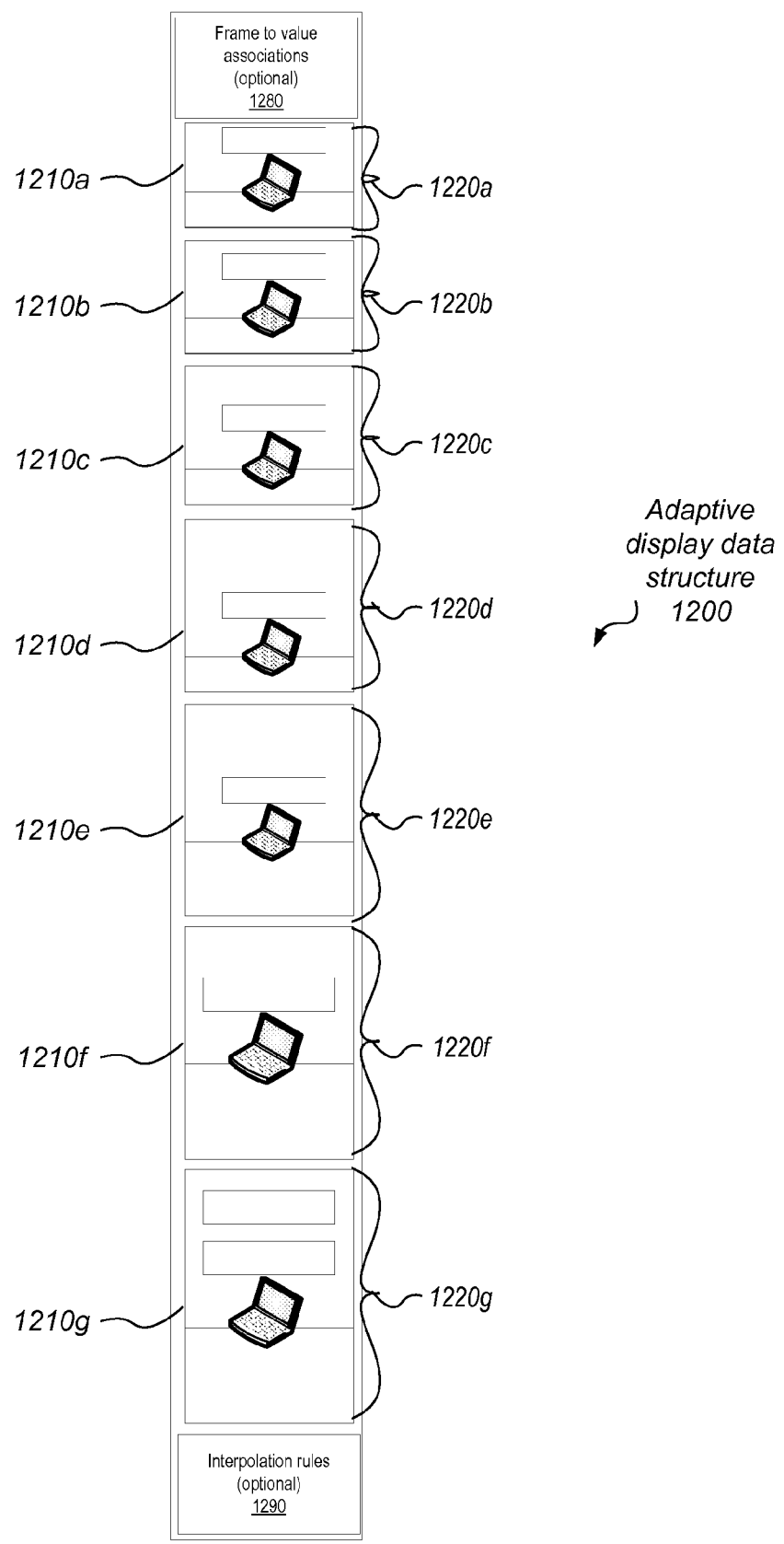
FIG. 12 depicts an adaptive display data structure according to some embodiments.

FIG. 12 depicts an adaptive display data structure according to some embodiments. An adaptive display data structure 1200 includes a series of frames 1210a-1210g varying in a dimension 1210a-1210g. In some embodiments, an adaptive content display module selects one of frames 1210a-1210g for use as a display frame based on a value of a dimension of a display area. Additionally, adaptive display data structure 1200 includes a set of optional interpolation rules 1290 for allowing an adaptive content display module to generate a display frame by interpolation between content of a first frame and a second frame of frames 1210a-1210g. In some embodiments, each of frames 1210a-1210g is associated with a value of a dimension by an authoring module. Further, interpolation rules 1290 are associated with frames 1210a-1210g or with values of the dimension. Frame to value associations 1280 are explicitly provided as a separate data structure in some embodiments. In other embodiments, the association between a frame and a value is inherently provided by the values of the dimensions 1210a-1210g of each of the frames 1210a-1210g.

Example Adaptive Content Authoring Interface

Figure 13:
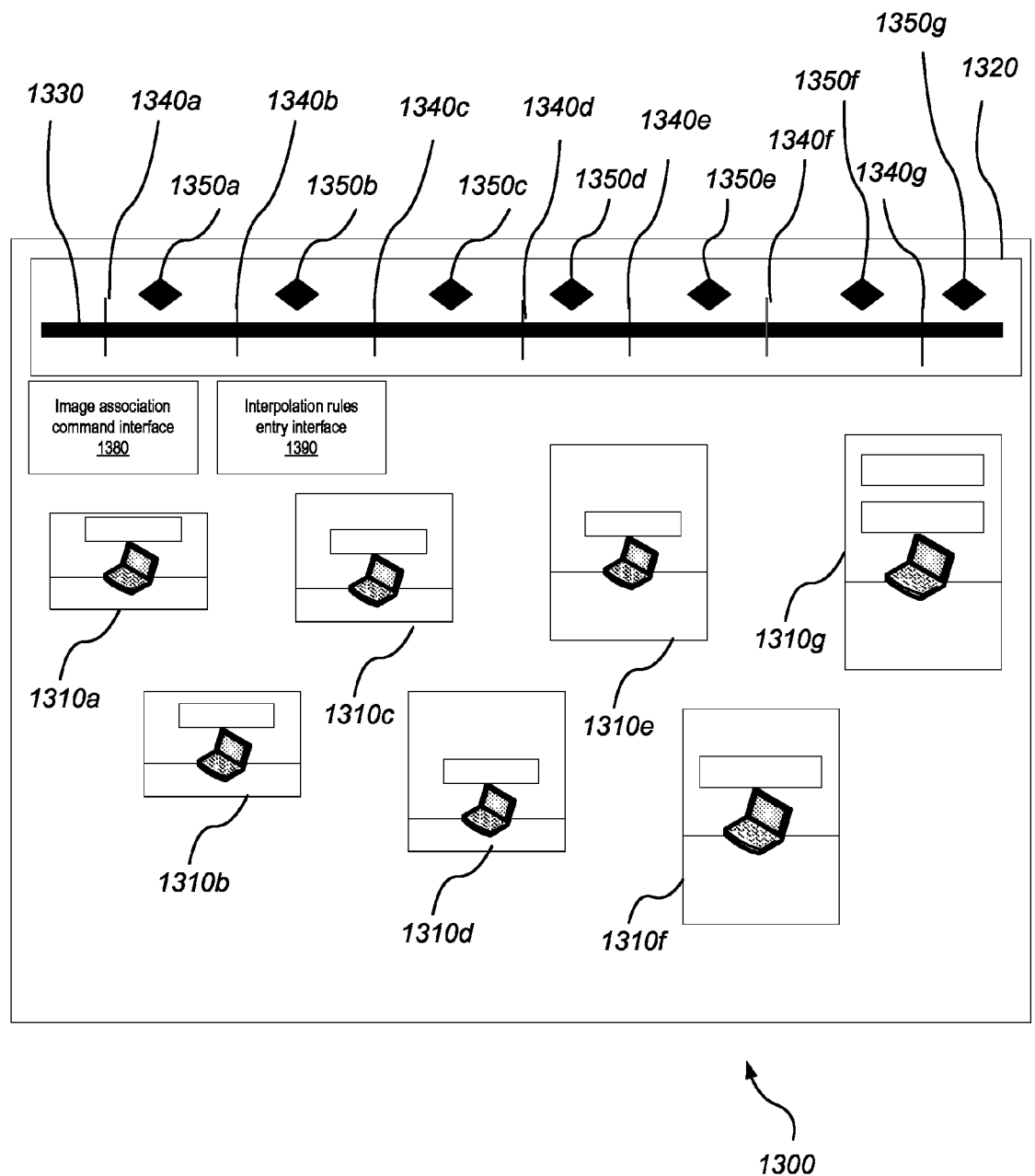
FIG. 13 illustrates an interface that may be used to implement adaptive content authoring according to some embodiments.

FIG. 13 illustrates an interface that may be used to implement adaptive content authoring according to some embodiments. A dimensionally-linked authoring interface 1300 includes a dimension control 1320 for associating values 1340a-1340g of a dimension 1330 to frames 1310a-1310g. An image association command interface 1380 is used for entering commands needed to associated values 1340a-1340g of a dimension 1330 to frames 1310a-1310g. An interpolation rules entry interface 1390 is provides an interpolation control for specifying rules governing generation of display frames by interpolation between frames 1310a-1310g and includes interface components for receiving input specifying a rule for generating a display frame from a first frame and a second frame of the frames 1310a-1310g. The rules received through interpolation rules entry interface 1390 control an interpolation between content of the first frame and content of the second frame to generate the display frame. In one embodiment, dimension control 1320 provides rule indicators 1350a-1350g for indicating that rules associated with frames 1310a-1310g or values 1340a-1340g have been specified.

Figure 14A:
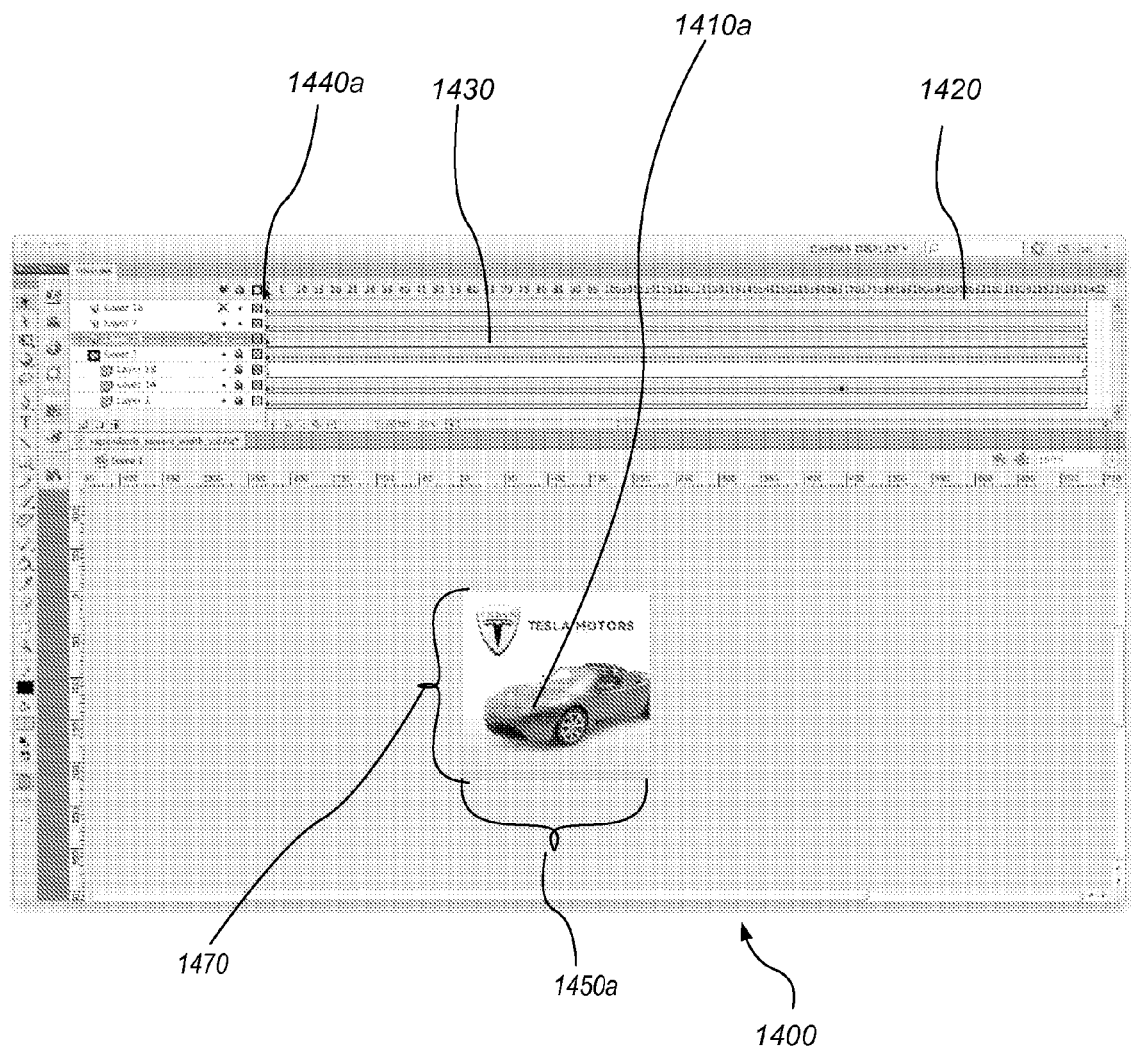
FIGS. 14A-14C depict an interface that may be used to implement adaptive content authoring according to some embodiments.
Figure 14B:
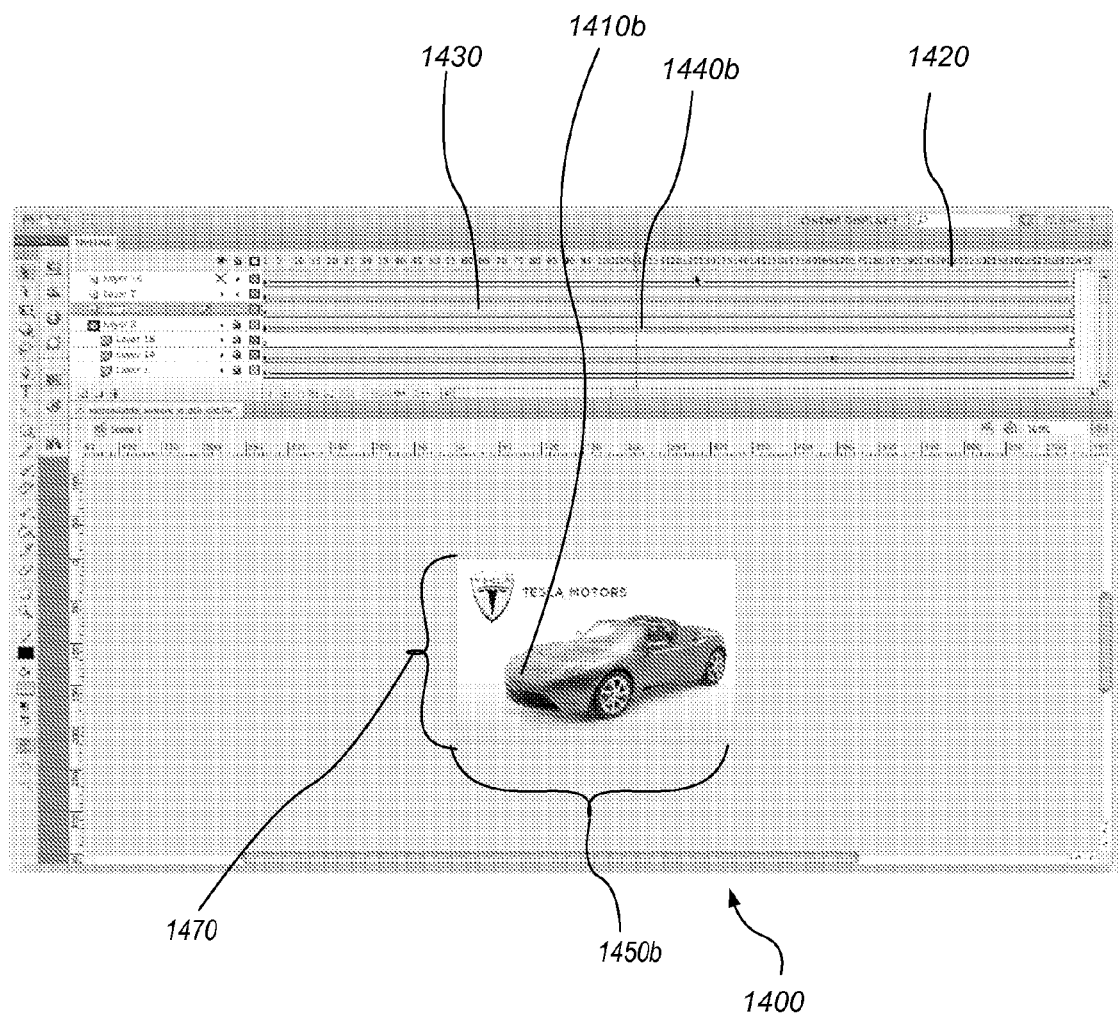
Figure 14C:
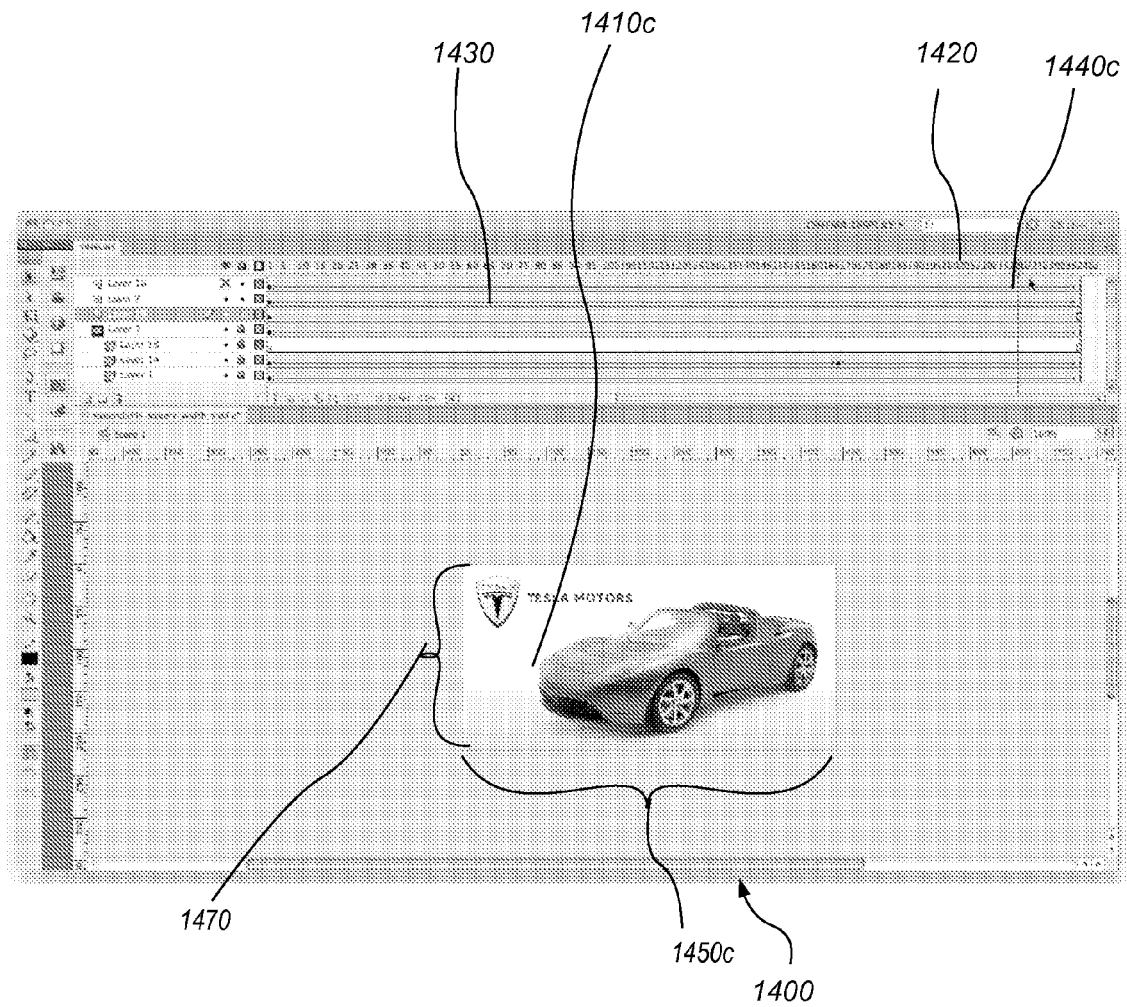

FIGS. 14A-14C depict an interface that may be used to implement adaptive content authoring according to some embodiments. As shown in FIG. 14A, a dimensionally-linked authoring interface 1400 includes a dimension control 1420 for associating a value 1440a of a dimension 1430 to a frame 1410a. In one embodiment, frame 1410a has a first dimension 1450a and a second dimension 1470.

As portrayed in FIG. 14B, dimensionally-linked authoring interface 1400 includes a dimension control 1420 for associating a value 1440b of a dimension 1430 to a frame 1410b. In one embodiment, frame 1410b has a first dimension 1450b and a second dimension 1470. Value 1440a and value 1440b differ, and each is associated with a respective one of frame 1410a and frame 1410b to facilitate selection for display based on correspondence of a dimension of a display area to one of dimension 1450a or dimension 1450b.

As portrayed in FIG. 14C, dimensionally-linked authoring interface 1400 includes a dimension control 1420 for associating a value 1440c of a dimension 1430 to a frame 1410c. In one embodiment, frame 1410c has a first dimension 1450c and a second dimension 1470. Value 1440a and value 1440c differ, and each is associated with a respective one of frame 1410a and frame 1410c to facilitate selection for display based on correspondence of a dimension of a display area to one of dimension 1450a or dimension 1450c.

Example System

Embodiments of an adaptive content authoring module and/or an adaptive content display module as described herein may be executed on one or more computer systems, which may interact with various other devices. One such computer system is illustrated by FIG. 15. In different embodiments, computer system 1500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1500 includes one or more processors 1510a, b, . . . n coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some embodiments, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510a, b, . . . n, or a multiprocessor system including several processors 1510a, b, . . . n (e.g., two, four, eight, or another suitable number). Processors 1510a, b, . . . n may be any suitable processor capable of executing instructions. For example, in various embodiments, processors 1510a, b, . . . n may be general-purpose or embedded processors implementing any of a variety of instruction set architectures (ISAs), such as the x86, Power PC, SPARC, or MIPS ISAs, or any other suitable ISA. In multiprocessor systems, each of processors 1510a, b, . . . n may commonly, but not necessarily, implement the same ISA.

In some embodiments, at least one processor 1510a, b, . . . n may be a graphics processing unit. A graphics processing unit or GPU may be considered a dedicated graphics-rendering device for a personal computer, workstation, game console or other computing or electronic device. Modem GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1520 may be configured to store program instructions and/or data accessible by processor 1510a, b, . . . n. In various embodiments, system memory 1020 may be implemented using any suitable memory technology, such as static random access memory (SRAM), synchronous dynamic RAM (SDRAM), nonvolatile/Flash type memory, or any other type of memory. In the illustrated embodiment, program instructions and data implementing desired functions, such as those described above for embodiments of an adaptive content authoring module and I or an adaptive content display module are shown stored within system memory 1520 as program instructions 1525 and data storage 1535, respectively. In other embodiments, program instructions and/or data may be received, sent or stored upon different types of computer accessible media or on similar media separate from system memory 1520 or computer system 1500. Generally speaking, a computer-accessible medium may include storage media or memory media such as magnetic or optical media, e.g., disk or CD/DVD-ROM coupled to computer system 1500 via I/O interface 1530. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1540.

In one embodiment, I/O interface 1530 may be configured to coordinate I/O traffic between processor 1510a, b, . . . n, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510a, b, . . . n). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510a, b, . . . n.

Network interface 1540 may be configured to allow data to be exchanged between computer system 1500 and other devices attached to a network, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1525, configured to implement embodiments of a an adaptive content authoring module and an adaptive content display module as described herein, and data storage 1535, comprising various data accessible by program instructions 1525. In one embodiment, program instructions 1525 may include software elements of embodiments of an adaptive content authoring module and an adaptive content display module as illustrated in the above Figures. Data storage 1535 may include data that may be used in embodiments. In other embodiments, other or different software elements and data may be included.

Those skilled in the art will appreciate that computer system 1500 is merely illustrative and is not intended to limit the scope of an adaptive content authoring module and an adaptive content display module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1000 via transmission media or signals such as electrical, electromagnetic, or digital signals, conveyed via a communication medium such as a network and/or a wireless link.

Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    displaying a dimensionally-linked authoring interface including a dimension control for associating values of a dimension of a display area of an end-user platform to frames;
    receiving a plurality of frames and input associating each of the plurality of frames to a respective value of the dimension;
    generating a data structure comprising the plurality of frames and associations between each of the frames and the respective values of the dimension corresponding to the respective display area of the end-user platform; and
    generating a display frame associated with a value of the dimension between two consecutive values of the dimension associated with two respective frames of the plurality of frames by interpolation between a first frame and a second frame of the two respective frames, such that
        a value of the dimension associated with the first frame is less than the value of the dimension associated with the display frame, and
        a value of the dimension associated with the second frame is greater than the value of the dimension associated with the display frame,
        the generating the display frame controls interpolation between content of the first frame and content of the second frame to generate the display frame based on an interpolation between the values of the dimension associated with the first and second frames such that the interpolated value of the dimension is equal to the value of the dimension associated with the display frame.

2. The computer-implemented method of claim 1, wherein the receiving input specifying the rule further comprises receiving input specifying instructions for adjusting a size of a common content element between a size in the first frame and a size in the second frame.

3. The computer-implemented method of claim 1, wherein the receiving input specifying the rule further comprises receiving input specifying instructions for adjusting a position of a common content element between a position relative to a background element in the first frame and a position relative to a background element in the second frame.

4. The computer-implemented method of claim 1, wherein the receiving input specifying the rule further comprises receiving input specifying a common value of another dimension for each of the plurality of frames.

5. The computer-implemented method of claim 1, wherein the receiving input specifying the rule further comprises receiving input specifying rendering a common content element of a size in the display frame equal to the size of the common content element in the first frame.

6. The computer-implemented method of claim 1, wherein the receiving input specifying the rule further comprises receiving input specifying integrating into the display frame a content item that is not present in the first frame.

7. The computer-implemented method of claim 1, further comprising:
    displaying in the dimensionally-linked authoring interface an interpolation control for specifying rules governing generation of display frames;
    receiving input specifying a rule for generating the display frame; and
    associating the rule with one or more frames of the plurality of frames.

8. A non-transitory computer-readable storage medium storing program instructions computer-executable to perform operations comprising:
    displaying a dimensionally-linked authoring interface including a dimension control for associating values of a dimension of display area of an end-user platform to frames;

receiving a plurality of frames and input associating each of the plurality of frames to a respective value of the dimension;

generating a data structure comprising the plurality of frames and associations between each of the frames and the respective values of the dimension corresponding to the respective display area of the end user platform; and generating a display frame associated with a value of the dimension between two consecutive values of the dimension associated with two respective frames of the plurality of frames by interpolation between a first frame and a second frame of the two respective frames, such that a value of the dimension associated with the first frame is less than the value of the dimension associated with the display frame, and a value of the dimension associated with the second frame is greater than the value of the dimension associated with the display frame, the generating the display frame controls interpolation between content of the first frame and content of the second frame to generate the display frame based on an interpolation between the values of the dimension associated with the first and second frames such that the interpolated value of the dimension is equal to the value of the dimension associated with the display frame.

9. The non-transitory computer-readable storage medium of claim 8, further comprising receiving input specifying instructions for adjusting a size of a common content element between a size in the first frame and a size in the second frame.

10. The non-transitory computer-readable storage medium of claim 8, further comprising receiving input specifying instructions for adjusting a position of a common content element between a position relative to a background element in the first frame and a position relative to a background element in the second frame.

11. The non-transitory computer-readable storage medium of claim 8, further comprising receiving input specifying a common value of another dimension for each of the plurality of frames.

12. The non-transitory computer-readable storage medium of claim 8, further comprising receiving input specifying rendering a common content element of a size in the display frame equal to the size of the common content element in the first frame.

13. The non-transitory computer-readable storage medium of claim 8, further comprising receiving input specifying integrating into the display frame a content item that is not present in the first frame.

14. The non-transitory computer-readable storage medium of claim 8, further comprising:
displaying in the dimensionally-linked authoring interface an interpolation control for specifying rules governing generation of display frames;
receiving input specifying a rule for generating the display frame; and
associating the rule with one or more frames of the plurality of frames.

15. A system, comprising:
at least one processor; and
a memory comprising program instructions executable by the at least one processor to perform operations including:
displaying a dimensionally-linked authoring interface including a dimension control for associating values of a dimension of display area of an end-user platform to frames;
receiving a plurality of frames and input associating each of the plurality of frames to a respective value of the dimension;
generating a data structure comprising the plurality of frames and associations between each of the frames and the respective values of the dimension corresponding to the respective display area of the end-user platform; and
generating a display frame associated with a value of the dimension between two consecutive values of the dimension associated with two respective frames of the plurality of frames by interpolation between a first frame and a second frame of the two respective frames, such that
a value of the dimension associated with the first frame is less than the value of the dimension associated with the display frame, and
a value of the dimension associated with the second frame, is greater than the value of the dimension associated with the display frame,
the generating the display frame controls interpolation between content of the first frame and content of the second frame to generate the display frame based on an interpolation between the values of the dimension associated with the first and second frames such that the interpolated value of the dimension is equal to the value of the dimension associated with the display frame.

16. The system of claim 15, further comprising receiving input specifying instructions for adjusting a size of a common content element between a size in the first frame and a size in the second frame.

17. The system of claim 15, further comprising receiving input specifying instructions for adjusting a position of a common content element between a position relative to a background element in the first frame and a position relative to a background element in the second frame.

18. The system of claim 15, further comprising receiving input specifying a common value of another dimension for each of the plurality of frames.

19. The system of claim 15, further comprising receiving input specifying rendering a common content element of a size in the display frame equal to the size of the common content element in the first frame.

20. The system of claim 15, further comprising:
displaying in the dimensionally-linked authoring interface an interpolation control for specifying rules governing generation of display frames;
receiving input specifying a rule for generating the display frame; and
associating the rule with one or more frames of the plurality of frames.

* * * * *